(12) United States Patent
Seidemann et al.

(10) Patent No.: US 12,556,384 B2
(45) Date of Patent: Feb. 17, 2026

(54) METHOD FOR PSEUDO-RANDOM NUMBER GENERATION FOR INFORMATION ENCRYPTION

(71) Applicant: BASF SE, Ludwigshafen am Rhein (DE)

(72) Inventors: Lothar Seidemann, Ludwigshafen am Rhein (DE); Holger Petersen, Ludwigshafen am Rhein (DE); Rainer Friehmelt, Ludwigshafen am Rhein (DE); Oliver Pikhard, Ludwigshafen am Rhein (DE); Holger Kai Peter Jelich, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 310 days.

(21) Appl. No.: 17/623,708

(22) PCT Filed: Jun. 16, 2020

(86) PCT No.: PCT/EP2020/066628
§ 371 (c)(1),
(2) Date: Dec. 29, 2021

(87) PCT Pub. No.: WO2021/001147
PCT Pub. Date: Jan. 7, 2021

(65) Prior Publication Data
US 2022/0271931 A1    Aug. 25, 2022

(30) Foreign Application Priority Data
Jul. 4, 2019   (EP) ..................... 19184445

(51) Int. Cl.
*H04L 9/08* (2006.01)
*G06F 7/58* (2006.01)

(52) U.S. Cl.
CPC ............ *H04L 9/0869* (2013.01); *G06F 7/582* (2013.01); *H04L 9/0866* (2013.01)

(58) Field of Classification Search
None
See application file for complete search history.

(56) References Cited

U.S. PATENT DOCUMENTS 4,207,154 A * 6/1980 Lemelson .............. B21D 26/06
                                                    204/157.44
5,082,143 A * 1/1992 Schramm, Jr. ........ G07F 13/065
                                                    222/66

(Continued)

FOREIGN PATENT DOCUMENTS

EP    0874289 A2 * 11/1997 ............. G03G 15/08
EP    1550921 A1 * 12/2004 ............. G03G 21/18

(Continued)

OTHER PUBLICATIONS

Young-Chang Hou, Visual cryptography for color images, Pattern Recognition, vol. 36, Issue 7, 2003, pp. 1619-1629, ISSN 0031-3203, https://doi.org/10.1016/S0031-3203(02)00258-3 (Year: 2003).*

(Continued)

*Primary Examiner* — Paul R Fisher
(74) *Attorney, Agent, or Firm* — Faegre Drinker Biddle & Reath LLP

(57) ABSTRACT

A method of generating at least one encryption key (130) for encrypting data (142), a method of 5 data transmission between at least two communication systems (136, 138), a method of encrypting data (142) and a method of decrypting encrypted data (144) are disclosed. Further disclosed are an encryption key generating device (110), a system (134), a data encryption system (148) and a data decryption system (150). The method of generating at least one encryption key (130) for encrypting data (142), specifically for data transmission over an insecure channel, comprises: i. blending at (Continued)

least two materials (114) according to at least one item of blending in-formation by using a blending device (112), thereby generating at least one blend (120); ii. detecting at least one material property (124) of the blend (120) by using at least one detector (126); and iii. transforming the material property (124) into the encryption key (130) by using at least one data processing device (132) configured for applying at least one trans-formation algorithm to the material property (124).

20 Claims, 7 Drawing Sheets

(56) References Cited

U.S. PATENT DOCUMENTS

| | | | |
|---|---|---|---|
| 6,233,339 | B1 | 5/2001 | Kawano et al. |
| 9,465,960 | B2 * | 10/2016 | Tucker ............... G06F 21/73 |
| 9,933,445 | B1 * | 4/2018 | Lynn ............... A61B 5/4845 |
| 10,015,148 | B2 * | 7/2018 | Heffner ............... H04L 9/0819 |
| 2001/0046293 | A1 | 11/2001 | Gleeson |
| 2002/0021003 | A1 * | 2/2002 | McGrew ............... G07D 7/0032 |
| | | | 283/93 |
| 2007/0269042 | A1 * | 11/2007 | Tanaka ............... H04K 1/00 |
| | | | 380/44 |
| 2009/0289776 | A1 * | 11/2009 | Moore ............... G06Q 20/352 |
| | | | 340/10.41 |
| 2012/0308001 | A1 * | 12/2012 | Arnold ............... H04L 9/0877 |
| | | | 380/44 |
| 2015/0161415 | A1 | 6/2015 | Kreft |
| 2018/0205564 | A1 | 7/2018 | Shahrjerdi et al. |

FOREIGN PATENT DOCUMENTS

| | | | |
|---|---|---|---|
| JP | 10-187546 A | 7/1998 | |
| JP | 2010-268308 A | 11/2010 | |
| WO | 97/24699 A1 | 7/1997 | |
| WO | WO0150530 A1 * | 12/1999 | ............ H01L 23/58 |
| WO | WO2007116401 A1 * | 10/2007 | ............ G11B 20/00 |
| WO | 2008/001243 A2 | 1/2008 | |
| WO | 2013/015252 A1 | 1/2013 | |

OTHER PUBLICATIONS

International Preliminary Report on Patentability received for PCT Patent Application No. PCT/EP2020/066628, mailed on Jan. 13, 2022, 8 pages.

International Search Report and Written Opinion received for PCT Patent Application No. PCT/EP2020/066628, mailed on Aug. 17, 2020, 9 pages.

* cited by examiner

METHOD FOR PSEUDO-RANDOM NUMBER GENERATION FOR INFORMATION ENCRYPTION

CROSS-REFERENCE TO RELATED APPLICATIONS

This application is a national stage application (under 35 U.S.C. § 371) of PCT/EP2020/066628, filed Jun. 16, 2020, which claims benefit of European Application No. 19184445.5, filed Jul. 4, 2019, both of which are incorporated herein by reference in their entirety.

TECHNICAL FIELD

The invention relates to a method of generating at least one encryption key for encrypting data, to a method of data transmission between at least two communication systems, to a method of encrypting data, to a method of decrypting data, to an encryption key generating device for generating at least one encryption key for encrypting data, to a system comprising first and second communication systems, to a data encryption system and to a data decryption system. The methods, devices and systems according to the present invention specifically may be used for secure communication over at least one insecure channel, such as for data transmission over an insecure channel like e.g. the Internet or radio communication. Further, at least some of the methods and devices of the present invention may also be used in the field of data encryption for secure data storage purposes or the like. Thus, encrypted data may also be stored, such as in one or more data storage devices accessible over the at least one insecure channel, such as over the Internet. Other applications are possible.

BACKGROUND ART

In many applications, information or data representing information has to be transmitted or stored in an insecure environment, such as publicly accessible communication networks, the cloud or the like. In order to ensure that the data is accessible only to authorized persons or entities, various cryptographic methods have been developed. Therein, data, such as data representing a message or other information is generally encoded in such a way that only authorized parties can access the data, whereas parties not authorized cannot or, at least, can only do so with significant difficulty or technical effort. Typically, data is encrypted by using at least one encryption algorithm using at least one encryption key, wherein the data, also referred to as plaintext, is generally transformed into encrypted data, also referred to as ciphertext. For decrypting the encrypted data or ciphertext and for retrieving the original data or plaintext, decrypting algorithms are used, which typically apply one or more encryption keys, too. Therein, the at least one encryption key used for decrypting may be identical to the at least one encryption key used for encrypting or, alternatively, different encryption keys may be used for encrypting and decrypting. While it is, in principle, possible to decrypt the message without possessing the encryption key, generally, for most of the nowadays used encryption algorithms, considerable computational resources, skills and computational time are required. An authorized recipient, however, can typically easily decrypt the encoded data, specifically the encoded message, with the use of the encryption key, such as the encryption key provided by the originator to recipients but not to unauthorized users.

One technical challenge in typical cryptographic methods generally resides in generating the at least one encryption key for the encryption process and/or for the decryption process. In practical applications, significant computational effort may have to be applied in order to generate, by using appropriate key generating algorithms, keys providing satisfactory data security for the data to be stored and/or or transmitted. Further, specifically in symmetric encryption algorithms, the transmittal of the encryption key, specifically over insecure data transmission channels, is still a challenge. Thus, the encryption key may be accessed by unauthorized parties or may even be intercepted and changed by unauthorized parties. There is, consequently, a need for simple and still secure means of generating encryption keys, of encrypting and decrypting data and for simple and secure encrypted data transmission.

The technical challenge is further increased by progress in computer technology and by the possibility of applying a so-called "brute-force approach" for decrypting encrypted data. Thus, with increasing availability of computer power and resources, trial-and-error approaches for decrypting data become possible. The challenge is even increased by the fact that, within the near future, quantum computing might be available for decrypting arbitrary algorithmic approaches of data encryption.

Problem to be Solved

It is therefore desirable to provide methods and devices which address the above-mentioned technical challenges. Specifically, a method for generating an encryption key shall be provided as well as corresponding systems and devices, which ensure secure storage and/or transmission of data and which still are resource-saving and fast. Further, the issue of transmitting encryption keys, specifically in insecure environments and/or over publicly accessible data transmission channels, shall be addressed.

SUMMARY

This problem is addressed by a method of generating at least one encryption key for encrypting data, by a method of data transmission between at least two communication systems, by a method of encrypting data, to a method of decrypting data, by an encryption key generating device for generating at least one encryption key for encrypting data, by a system comprising first and second communication systems, by a data encryption system and by a data decryption system, with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a method of generating at least one encryption key for encrypting data is proposed. The encryption key specifically may be used for data transmission over an insecure channel, such as for encrypting data to be transmitted over the insecure channel and/or for decrypting data after transmission over the insecure channel. The method comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:
i. blending at least two materials according to at least one item of blending information by using a blending device, thereby generating at least one blend;
ii. detecting at least one material property of the blend by using at least one detector; and
iii. transforming the material property into the encryption key by using at least one data processing device configured for applying at least one transformation algorithm to the material property.

The term "generating" as used herein is a broad term and is to be given its ordinary and customary meaning to a person of ordinary skill in the art and is not to be limited to a special or customized meaning. The term specifically may refer, without limitation, to the process of providing an object, wherein virtual and/or real objects may be provided. Thus, as an example, the object may be a an article or may be an item of information. The generating may imply producing the object, wherein the object may be produced fully or partially. The producing of the object may imply a real production process and/or may imply one or more virtual production steps. Thus, specifically in case the object comprises a virtual object, specifically an item of information, the producing of the object may imply one or more virtual production steps, such as one or more computational steps, specifically one or more steps performed by a computer. In case the object is a virtual object, specifically an item of information, the object may, as an example, be provided as an analogue and/or digital signal, via an interface or in a data storage device.

The term "data" as used herein is a broad term and is to be given its ordinary and customary meaning to a person of ordinary skill in the art and is not to be limited to a special or customized meaning. The term specifically may refer, without limitation, to information and/or to machine-readable signals or symbols representative for information. The data specifically may be or may comprise one or both of digital data and analogue data. The data, as an example, may be stored and/or provided via at least one data storage device.

The term "encrypt" as used herein is a broad term and is to be given its ordinary and customary meaning to a person of ordinary skill in the art and is not to be limited to a special or customized meaning. The term specifically may refer, without limitation, to the process of modifying one or more of a message, information or data, by using at least one encryption means, also referred to as an encryption key, such that only authorized parties can access it and those who are not authorized cannot. The modified data, as generated by the encryption process, may also be referred to as "encrypted data". Specifically, the encryption may comprise a process of modifying one or more of a message, information or data in such a way that only a person being in possession of specific authorization means, also referred to as an encryption key, may transform the modified message, information or data into its original or readable form and, thereby, may retrieve the original message, information or data. The encrypting or encryption process, i.e. the process of modifying the message, information or data specifically may involve an encryption algorithm, by combining the message, information or data with at least one encryption key. As an example, in a binary format, each bit of the message, information or data may be combined with a corresponding bit of the encryption key, thereby generating an encrypted bit. Other encryption algorithms are generally known and may also be used in the context of the present invention.

Consequently, the term "decrypt" as used herein is a broad term and is to be given its ordinary and customary meaning to a person of ordinary skill in the art and is not to be limited to a special or customized meaning. The term specifically may refer, without limitation, to the reverse process of the above-described process of encryption. The term specifically may refer, without limitation, to the process of re-modifying encrypted data, by using at least one decryption means, also referred to as an encryption key, such that the encrypted data is transformed into the readable format, i.e. into one or more of the original message, information or data in a readable format. The process of modifying the encrypted data specifically may involve a decryption algorithm, e.g. combining the encrypted data with the at least one encryption key. As an example, in a binary format, each bit of the encrypted data may be combined with a corresponding bit of the encryption key, thereby generating a decrypted bit. Other decryption algorithms are generally known and may also be used in the context of the present invention.

Consequently, the term "encryption key" as used herein is a broad term and is to be given its ordinary and customary meaning to a person of ordinary skill in the art and is not to be limited to a special or customized meaning. The term specifically may refer, without limitation, to an encryption means or decryption means used in an encryption process or in a decryption process, respectively. The term specifically may refer to an item of information that determines the functional output of a cryptographic algorithm such as an encryption process and/or the decryption process. Encryption keys may also specify transformations in other cryptographic algorithms, such as digital signature schemes and message authentication codes.

For the process of encryption and for the process of decryption, identical keys may be used. Thus, both for the key used in the encryption process and for the key used in the decryption process, the term "encryption key" is typically used. Still, besides symmetric encryption and decryption processes, also asymmetrical processes are generally possible, i.e. processes in which the keys used for encryption and for decryption are not identical. Still, in the terminology of the present invention, the term "encryption key" is used both for the key used in encryption and for the key used in decryption. The present invention may refer to the symmetrical encryption processes. Still, asymmetric encryption processes are also possible.

The term "data transmission" as used herein is a broad term and is to be given its ordinary and customary meaning to a person of ordinary skill in the art and is not to be limited to a special or customized meaning. The term specifically may refer, without limitation, to process of providing data from at least one sending entity or transmitter to at least one receiving entity or receiver via at least one transmission means, such as at least one transmission channel and/or at least one transmission device. The transmission specifically may take place in an electronic fashion, i.e. by transmitting at least one electronic signal and/or electromagnetic waves, such as radio waves and/or light. As an example, the transmission channel may comprise at least one of a cable or an interface. Specifically, the channel may comprise the internet or World Wide Web. Additionally or alternatively, the transmission channel may also comprise at least one radio channel and/or a light beam. The transmission, however, may also take place via exchange of a physical data storage device having the data stored thereon. The transmission channel may fully or partially be embodied in a wireless fashion and/or may fully or partially be embodied in a wirebound fashion. The transmission may take place continuously or discontinuously. Consequently, the term "channel" as used herein is a broad term and is to be given its ordinary and customary meaning to a person of ordinary skill in the art and is not to be limited to a special or customized meaning. The term specifically may refer, without limitation, to an arbitrary means for data transmission, continuously or discontinuously, via one or more of a wirebound connection, a wireless connection or the exchange of a data storage device.

The term "insecure" as used herein is a broad term and is to be given its ordinary and customary meaning to a person of ordinary skill in the art and is not to be limited to a special or customized meaning. The term specifically may refer, without limitation, to the property of a channel for transmission being accessible not only for the transmitting entity and the receiving entity but also to third parties. Thus, specifically, an insecure channel, as outlined above, may be or may comprise the internet.

The term "material" as used herein is a broad term and is to be given its ordinary and customary meaning to a person of ordinary skill in the art and is not to be limited to a special or customized meaning. The term specifically may refer, without limitation, to a chemical element or a chemical compound, specifically a chemical element or a chemical compound being capable of mixing with other chemical elements or chemical compounds. The material specifically may be suitable for pouring. The material generally may be in one or more of a solid state, specifically a granular solid state, a liquid state or a gaseous state. Specifically, the material may be or may comprise at least one of a powder or a liquid. The material may be a homogeneous, unitary material. Alternatively, the material may also comprise a plurality of components which are mixed homogeneously or inhomogeneously. Thus, the material may be a mixture or a composite by itself. As an example, the material may be or may comprise a liquid, wherein the liquid, as an example, comprise at least one solvent and at least one chemical compound dissolved, emulsified or dispersed in the at least one solvent. The solvent may form part of the material, or, alternatively, the at least one chemical compound may be considered the material, whereas the solvent may simply be considered as an adjuvant or additive to the material.

Consequently, the term "blending" as used herein is a broad term and is to be given its ordinary and customary meaning to a person of ordinary skill in the art and is not to be limited to a special or customized meaning. The term specifically may refer, without limitation, to the process of mixing the at least two materials in a defined manner, thereby creating a blend. The mixing take place in various ways, in accordance with the nature of the at least two materials. As an example, in case the at least two materials comprise powders, the mixing may involve co-dispensing or subsequently dispensing the powders into a common receptacle, including the option of stirring the mixture. Additionally or alternatively, in case the at least two materials comprise liquids, the mixing may also involve co-dispensing or subsequently dispensing the liquids into a common receptacle, including the option of stirring the mixture. Additionally or alternatively, as will be outlined in further detail below, the mixing may also comprise printing processes, e.g. inkjet printing of the at least two materials, e.g. onto a common substrate. Additionally or alternatively, the blending may comprise other types of mixing processes of the at least two materials, such as mixing the at least two materials on at least one common substrate. As an example, the blending may comprise one or more electrostatic precipitation processes, such as electrostatic precipitation of the at least two materials, e.g. onto a common substrate, e.g. onto an electrostatic charged surface. Thus, specifically, the blending and/or mixing may comprise electrostatic precipitation in printing processes. For example, the blending and/or mixing may comprise electrostatic precipitation in printing processes of at least two electrostatic charged materials onto an electrostatic neutralized surface. Thus, the materials may be mixed, thereby at least temporarily changing their electrical charges. Specifically, the blending and/or mixing may comprise electrostatic precipitation in laser printing processes, such as processes typically performed in a laser printer. In particular, the at least two materials, e.g. the pigments, may for example firstly be electrostatically charged and deposited on an equally charged image roll where specific areas have been electrostatically neutralized, e.g. by using a laser and/or LED. These deposited materials may, as an example, then be drawn and/or removed off the image roll by a reversely charged substrate, such as by a reversely charged paper.

The blending may leave the materials unchanged or may also fully or partially change the nature of the materials. Thus, as an example, the materials may simply be mixed without any chemical changes. Additionally or alternatively, the materials may be mixed, thereby changing their chemical nature. The latter specifically may take place in case the materials contain solvents which, during the blending or afterwards, may fully or partially evaporate. Again, additionally or alternatively, the materials may also fully or partially react with each other, thereby generating at least one reaction product.

Further consequently, the term "blend" as used herein is a broad term and is to be given its ordinary and customary meaning to a person of ordinary skill in the art and is not to be limited to a special or customized meaning. The term specifically may refer, without limitation, to a mixture of the at least two materials. The mixture specifically may be present in at least one receptacle and/or on at least one substrate. The mixture generally may be in one or more of a solid state, specifically a granular solid state, a liquid state or a gaseous state. Specifically, the mixture may be or may comprise at least one of a powder or a liquid. The mixture may be in the same state as the materials or may be in a different state. As an example, at least one of the materials may be in a liquid state, wherein the mixture may also be in a solid state, which may be the case e.g. after a drying process. Thus, as an example, the at least two materials may be mixed in the blending process in a liquid state, wherein, afterwards, a drying may take place, thereby evaporating at least one solvent and/or thereby changing the chemical nature of the mixed materials. As an example, the mixing process may imply a printing of the at least two materials in a liquid state onto at least one substrate, followed by a drying or setting process, wherein the blend, consequently, may be in a dried or solid state. Other examples may imply a phase change process, such as a curing or a solidifying of the materials after mixture.

The term "item of blending information" as used herein is a broad term and is to be given its ordinary and customary meaning to a person of ordinary skill in the art and is not to be limited to a special or customized meaning. The term specifically may refer, without limitation, to at least one item of information describing a defined blending process. The at least one item of blending information, as will be outlined in further detail below, may refer to the process of blending itself, such as to the way the at least two materials are mixed, e.g. to process parameters of the mixing process. Additionally or alternatively, the at least one item of blending information, as will also be outlined in further detail below, may also refer to the materials for blending, such as to quantities to be mixed in the blending process, e.g. to masses or volumes of the materials.

The term "blending device" as used herein is a broad term and is to be given its ordinary and customary meaning to a person of ordinary skill in the art and is not to be limited to a special or customized meaning. The term specifically may refer, without limitation, to a device which is configured for performing the above described blending process. Specifically, as will also be outlined in further detail below, the blending device may comprise at least one of a feed or a reservoir for each of the materials. The blending device may also comprise at least one blending element, such as at least one of a nozzle, a stirring device, a printer, a mixer or the like.

Consequently, the term "blend" as used herein is also a broad term and is to be given its ordinary and customary meaning to a person of ordinary skill in the art and is not to be limited to a special or customized meaning. The term specifically may refer, without limitation, to a mixture of at least two materials. The blend specifically may be present on a substrate or in a receptacle. The blend specifically may comprise a finite amount of the materials.

The term "material property" as used herein is a broad term and is to be given its ordinary and customary meaning to a person of ordinary skill in the art and is not to be limited to a special or customized meaning. The term specifically may refer, without limitation, to an arbitrary property of a material, such as of the blend. The property specifically may refer to one or more of a physical, a chemical or a biological property. Specifically, the material property may comprise at least one of a mechanical property or an optical property of the material. The material property specifically may refer to a measurable property of the respective material. Examples of material properties will be given in further detail below.

The term "detecting" as used herein is a broad term and is to be given its ordinary and customary meaning to a person of ordinary skill in the art and is not to be limited to a special or customized meaning. The term specifically may refer, without limitation, to the process of generating information on a property or measurable variable, wherein qualitative and/or quantitative information may be retrieved. The term specifically may refer to the process of measuring at least one measurable variable of an object. Consequently, the term "detector" as used herein is a broad term and is to be given its ordinary and customary meaning to a person of ordinary skill in the art and is not to be limited to a special or customized meaning. The term specifically may refer, without limitation, to an arbitrary device configured for performing the detecting process, such as a device having at least one sensor for measuring the at least one measurable variable of the object. As an example, the sensor may comprise one or more of: a weight sensor, specifically a scale; a volume sensor; a density sensor; a color sensor; a particle size distribution sensor. Other sensors may be used in addition or alternatively.

The transforming of the at least one material property into the at least one encryption key may take place in a computer-implemented fashion. Thus, as outlined above, the transforming of the at least one material property into the at least one encryption key takes place by using at least one data processing device configured for applying the at least one transformation algorithm to the material property. The term "data processing device" as used herein is a broad term and is to be given its ordinary and customary meaning to a person of ordinary skill in the art and is not to be limited to a special or customized meaning. The term specifically may refer, without limitation, to a computer or a computer system, having at least one processor and optionally having at least one data storage device. Therein, the processor, as an example, may comprise at least one integrated circuit configured for executing computer readable instructions. The processor, additionally or alternatively, may also be or may comprise at least one application-specific integrated circuit and/or at least one field-programmable gate array. The configuration of the data processing device for applying the at least one transformation algorithm, as an example, may be performed by providing a plurality of computer-readable instructions to the data processing device, e.g. via at least one data storage device and/or via at least one interface.

The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of an electronic device or system, and/or, generally, to a device which is configured for performing calculations or logic operations. In particular, the processor may be configured for processing basic instructions that drive the device or system, such as a computer. As an example, the processor may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory.

The term "algorithm" as used herein is a broad term and is to be given its ordinary and customary meaning to a person of ordinary skill in the art and is not to be limited to a special or customized meaning. The term specifically may refer, without limitation, to a plurality of process steps to be performed subsequently and/or in parallel. The algorithm specifically may comprise one or more mathematical operations to be applied to at least one input variable. Consequently, the term "transformation algorithm" specifically may refer to an algorithm which performs a transforming process for transforming the material property into the encryption key by using one or more mathematical operations to be applied to the at least one input variable.

The transformation of the material property into the encryption key may take place in a single step or in a plurality of steps. Thus, as will be outlined in further detail below, the blending step and the detecting step each may be performed only once, wherein the result of the detecting step is directly transformed into the final encryption key. Alternatively, however, one or more of or even all of the method steps of blending, detecting and transforming may be performed repeatedly, e.g. by generating one or more intermediate encryption keys, which, again, are used for additional blending and detecting steps, until, finally, the final encryption key is generated. Exemplary embodiments will be given in further detail below.

The transforming of the material property into the encryption key, as an example, may take place by providing at least one electronic signal, such as digital information, representative for the at least one material property to the at least one data processing device for further processing. Thus, as an example, the detector may directly or indirectly communicate with the data processing device or may even be part of the data processing device. Thus, the at least one material property may directly or indirectly be provided to the data processing device for further processing and four directly or, after preprocessing, applying the at least one transformation algorithm.

The result of the transforming process may be the encryption key, wherein the encryption key, as an example, may be provided in an electronic fashion. As an example, the encryption key may be or may comprise electronic information in a digital or analogue format. The encryption key, as an example, may be provided to one or more of a data storage device, and interface, a third-party or the like.

As will be outlined in further detail below, the method specifically may be fully or partially computer-implemented. Thus, specifically, step iii. may fully or partially be automated and/or performed in a computer-implemented fashion.

As discussed above, the data generally may be provided in various formats. Specifically, the data may be provided in digital format and/or the data may comprise digital data. The data specifically may comprise binary data. However, other data formats are also possible. The data specifically may be subdivided into data packages. Thus, as an example, the data may comprise a plurality of data packages, each data package comprising at least one of a data header, control data and a payload portion. The data, generally, may also comprise error correction data. Thus, as an example, the error correction data may comprise at least one parity bit or the like. Other data correction algorithms may be used.

The at least one item of blending information specifically may comprise n blending variables, wherein n denotes a positive integer. The term "blending variable" as used herein is a broad term and is to be given its ordinary and customary meaning to a person of ordinary skill in the art and is not to be limited to a special or customized meaning. The term specifically may refer, without limitation, to a variable which either quantitatively or qualitatively describes at least one aspect or parameter of the blending. As an example, the blending variable may refer to the at least two materials, to detect of the blending process such as quantities or material streams for mixture or the like. Further, in step ii., m material properties of the blend may be detected, with m being a positive integer. Specifically, the number m of material properties detected in step ii. may be as large or larger than the number n of blending variables. In other words, preferably, $m \geq n$. In still other words, specifically, the information generated in the detecting step ii. may be at least as large as the information used for the blending step, wherein the term "information" may refer to the numbers n and m, respectively, and/or may generally refer to the number of degrees of freedom and/or to the logarithm of the degrees of freedom, such as log n or log m, respectively.

The at least two materials blended in step i. specifically may be different materials, specifically materials being different with respect to at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape. Still, additionally or alternatively, other properties may be used.

The at least two materials specifically may comprise bulk materials and/or loose materials. The at least two materials, independently, each may be selected from the group consisting of solid materials, gaseous materials and liquid materials. More specifically, the at least two materials, independently, may be selected from the group consisting of and/or may comprise at least two materials selected from the group consisting of:

a powder, specifically a powder selected from the group consisting of:
an inorganic powder, specifically an inorganic powder made of a mineral;
an organic powder, specifically an organic powder made of a polymer;
a pigment;
a liquid, specifically a liquid selected from the group consisting of a pure liquid, a suspension, an emulsion or a solution, more specifically one or more of a liquid color and an ink.

As outlined above, step i. comprises blending the at least two materials according to at least one item of blending information. The at least one item of blending information specifically may comprise at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of a printer. Still, additionally or alternatively, other types of blending information may also be used.

The at least two materials may be fed into the blending device continuously or discontinuously. Thus, as an example, the blending device may comprise at least two reservoirs for the at least two materials to be blended. Additionally or alternatively, however, other means of feeding the materials into the at least one blending device are also possible. Thus, as an example, a continuous feeding is also possible, in addition or alternatively to using at least one reservoir for at least one of the materials.

The blending device may further comprise at least one receiving element for receiving the blend. As used herein, the term "receiving element" may generally refer to an arbitrary element configured for receiving the blend. The receiving element specifically may have at least one receiving surface and/or at least one receiving material for receiving the blend. Thus, as an example, the at least one receiving element specifically may comprise at least one element selected from the group consisting of: a receiving vessel for receiving the blend; a substrate for receiving the blend. The at least one receiving element may be a stationary receiving element and/or maybe a moving receiving element, such as a rotatable receiving element. As an example, the receiving element may comprise at least one substrate, such as a substrate having at least one substrate surface which may be or may comprise a planar substrate surface and/or which may be or may comprise a curved substrate surface. As an example, the receiving element may comprise at least one drum having a receiving surface for receiving the blend, such as a rotating drum. The blend, by using the blending device, specifically may be deposited directly or indirectly on to the rotating drum. As an example, a drum may be used on which the blend is temporarily secured, such as electrostatically. These electrostatic drums are generally known in the technical field of printing, such as laser printing.

In case the receiving element comprises at least one drum, the drum specifically may be a rotating drum. Therein, the method may further comprise at least one cleaning step in which, after detecting the at least one material property, the blend specifically may be removed from the receiving surface of the drum. As an example, powders and/or pigments may be dispensed onto a rotating drum and may be, as an example, temporarily secured to the surface of the rotating drum by electrostatic forces. During that time of securing the blend to the surface of the rotating drum, the at least one material property of the blend on the surface might be detected, e.g. by optical reading. As an example and as will be outlined in further detail below, colors may be detected and, subsequently, may, as an example, be transformed into binary information, such as a binary row of numbers. Subsequently, the drum may be cleaned, such as by rotating into a cleaning position, e.g. by rotating the drum by 90°.

A similar procedure, optionally without the securing by electrostatic forces, may also be performed by using inkjet printing, either directly onto the surface of a drum and/or onto a moving substrate, such as onto a paper substrate. The drum, after detecting the at least one property, may be cleaned for reuse. Thus, as an example, the blending device may comprise at least one inkjet printer. The materials may be or may comprise inkjet printing of the materials, which may be or may comprise liquid materials, onto the at least one receiving element, such as onto the at least one rotating drum and/or onto at least one substrate. Subsequently, the detection of the at least one material property may take place, such as of the at least one optical property, e.g. by optical reading. As an example, again, colors may be detected and, subsequently, may, as an example, be transformed into binary information, such as a binary row of numbers. Subsequently, the drum may be cleaned, such as by rotating into a cleaning position, e.g. by rotating the drum by 90°. Additionally or alternatively, besides cleaning the at least one receiving element, a new receiving element or a new part of the receiving element may be used for further steps, such as for further printing and for repeating the blending and the detecting.

The blending device specifically may comprise at least one blending element for generating the blend. The term "blending element" as used herein is a broad term and is to be given its ordinary and customary meaning to a person of ordinary skill in the art and is not to be limited to a special or customized meaning. The term specifically may refer, without limitation, to an arbitrary element, device or combination of elements configured for blending the at least two materials, specifically by mixing the at least two materials, e.g. before, during or after deposition onto the at least one optional receiving element. As an example, the at least one blending element may be or may comprise at least one element selected from the group consisting of: a dispenser for continuously or discontinuously dispensing at least one of the two materials; a printer for printing the at least two materials onto at least one receiving element, specifically onto at least one substrate, specifically at least one printer selected from the group consisting of: an inkjet printer, a laser printer. Still, additionally or alternatively, other types of blending elements may be used. Thus, as an example, the blending element may be or may comprise at least one of a stirring element, a dispenser, a nozzle, an extruder.

The at least one material property which is detected in step ii. may comprise a wide variety of detectable properties of the blend. Specifically, the material property may be chosen such that the material property is not directly derivable from a combination of material properties of the at least two materials, such that the material property of the blend is hardly predictable, e.g. due to chaotic processes, non-linear behavior or other unpredictable processes during the blending. Specifically, amorphous materials such as powders, when being blended, often lead to mixtures having unpredictable properties, such as density or distribution of the original materials in the blend. Specifically, the at least one material property detected in step ii. may be or may comprise at least one of a physical property of the blend and a chemical property of the blend. More specifically, the at least one material property may be or may comprise at least one property selected from the group consisting of: a specific density of the blend; a volume of the blend; a weight of the blend; an optical property of the blend; a color of the blend; a spectral composition of the blend, specifically a color spectrum of the blend; a color intensity of the blend; a viscosity of the blend. Other material properties may be used alternatively or additionally.

The step of detecting the at least one material property of the blend, i.e. step ii., specifically may comprise generating at least one item of measurement information on the material property. Thus, the at least one item of measurement information may generally refer to the result of a measurement of the at least one material property, such as to at least one numerical measurement value indicating the at least one material property of the blend or being characteristic for the at least one material property of the blend. Thus, as an example, the at least one item of measurement information may, as an example, comprise at least one of the following items of information: a specific density measurement value of the blend; a volume measurement value of the blend; a weight measurement value of the blend; an optical property measurement value of the blend; a color measurement value of the blend; a spectral composition measurement value of the blend, specifically a color spectrum measurement value of the blend; a color intensity measurement value of the blend; a viscosity measurement value of the blend. These measurement values might as an example each may be or may comprise a single number or a plurality of numbers, such as distributions, spectra or the like. Specifically, the at least one item of measurement information may be or may comprise at least one numerical value such as a digital value.

The transforming of the material property into the encryption key, i.e. step iii., specifically may comprise subjecting the at least one material property to at least one test, specifically to at least one predetermined test. As an example and as will be outlined in further detail below, the at least one test may be or may comprise comparing the at least one material property directly or indirectly, such as by using the at least one item of measurement information, with at least one comparison value, at least one comparison value range or the like. Other mathematical tests are generally feasible and may also be applied. In accordance with the result of the at least one test, the encryption key or at least a part thereof may be generated. The transforming of the material property into the encryption key specifically may comprise comparing the at least one material property, including the option of using the at least one item of measurement information representing the material property, with at least one threshold value. In accordance with the result of this comparison, at least one number may be assigned to the material property. The number specifically may be a binary number. The number may directly form the encryption key or may form part of the encryption key. Thus, as an example, the encryption key may comprise a plurality of its values, wherein at least one of the bit values is assigned in accordance with the result of a comparison of a material property with at least one threshold value. As an example and as will be outlined in further detail below, a spectrum or distribution of at least one material property of the blend may be measured, such as a distribution of colors. In accordance with e.g. the statistical occurrence of a specific color or with the statistical occurrence of another specific feature or property of the blend, a specific bit value may be chosen. Other bit values may be chosen accordingly, e.g. in accordance with other specific features of properties of the blend. Thereby, the full encryption key or at least a part thereof may be generated.

It shall be outlined that the encryption key may be generated in a single step or in a plurality of steps. Thus, the encryption key may also be generated iteratively, e.g. by repeating the steps of blending and detecting and, optionally, transforming, wherein, e.g., in each step of blending and detecting, a part of the encryption key is generated and/or further blending information is generated, for a further blending step. Thereby, complex and large encryption keys may be generated iteratively, even though the number of material properties of a single blend may be limited.

In a further aspect of the present invention, a method of data transmission between at least two communication systems is disclosed. The term "communication system" as used herein is a broad term and is to be given its ordinary and customary meaning to a person of ordinary skill in the art and is not to be limited to a special or customized meaning. The term specifically may refer, without limitation, to a device or a combination of devices configured for transmitting data and/or configured for receiving data. Therein, as will be outlined in further detail below, a communication system may be fixedly assigned the role of a transmitting system, i.e. a system configured for data transmission, or the role of a receiving system, i.e. a system configured for receiving transmitted data. Alternatively, however, the assignment of the role as a transmitting or receiving system may also be flexible or variable and, as an example, may be reassigned. Thus, a communication system may act both as a transmitting system and as a receiving system. As discussed above, the method of data transmission specifically may be dedicated or used for data transmission over an insecure channel.

The method of data transmission comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:
I. assigning the role of a transmitting system to at least one of the communication systems;
II. assigning the role of a receiving system to at least another one of the communication systems;
III. providing at least one item of blending information both to the transmitting system and to the receiving system;
IV. generating, by the transmitting system, at least one encryption key by using the at least one item of blending information and the method of generating at least one encryption key for encrypting data according to the present invention, such as according to any one of the embodiments described above and/or according to any one of the embodiments described in further detail below;
V. encrypting, by the transmitting system, the data to be transmitted by using the encryption key, thereby generating encrypted data;
VI. transmitting, by the transmitting system, the encrypted data to the receiving system;
VII. receiving, by the receiving system, the encrypted data;
VIII. generating, by the receiving system, the at least one encryption key by using the at least one item of blending information and the method of generating at least one encryption key for encrypting data according to the present invention, such as according to any one of the embodiments described above and/or according to any one of the embodiments described in further detail below; and
IX. decrypting, by the receiving system, the encrypted data by using the encryption key.

For further optional details and for possible definitions of the terms used herein, reference may be made to the description given above. As further outlined above, the method specifically may be performed iteratively. Thus, data may be transmitted between the at least two communication systems, either unidirectionally or bidirectionally. Thus, specifically in case a bidirectional communication is possible, the roles of the transmitting system and of the receiving system may be reassigned, specifically between repetitions of the method steps.

Specifically, the transmitting system and the receiving system may use the same at least one item of blending information, such as identical sets of blending instructions.

The at least one item of blending information, thus, may be transmitted, at least once, independently from the data transmission, such as by exchanging the at least one item of blending information or at least one initial item of blending information between the at least two communication systems and/or by providing the at least one item of blending information to all communication systems. In subsequent steps of data transmission, blending information may be generated from previously transmitted data. Thus, in case the method is performed iteratively or repeatedly, in at least one iteration the at least one item of blending information for the iteration may be derived from previously transmitted data. Additionally or alternatively, the initial provision of the at least one item of blending information may comprise providing at least one item of blending information for various repetitions of the steps, i.e. providing at least one item of blending information for at least two different repetitions of data transmission.

Thus, generally, the method may fully or partially be performed repeatedly. In at least one of the iterations, in step III., at least one item of blending information may be provided for at least one subsequent iteration. As an example, the at least one item of blending information may fully or partially be comprised in one or both of the encryption key itself and/or in the data. Consequently, part of the data transmitted in one iteration may contain at least one item of blending information for at least one subsequent data transmission. Thereby, encryption keys may be generated iteratively, by the transmitting system and/or by the receiving system.

In particular, the encryption key may comprise the item of blending information for a subsequent data transmission. Thus, the encryption key itself may be used for generating the encryption key for the subsequent data transmission, e.g. for generating a subsequent encryption key. Thus, as an example, the encryption key itself may comprise information of the process of blending, such as to the process parameters, e.g. to the quantities of and/or the way the at least two materials may be mixed. As an example, the item of blending information may be comprised at a predefined position within the encryption key. Specifically, the item of blending information may be comprised in the encryption key after a predefined amount of data. For example, the encryption key may comprise the item of blending information after transmittal of a predefined amount of data, such as at or after a predefined bit count. Additionally or alternatively, the item of blending information may be comprised in the encryption key at a predefined time or after a predefined time period. Specifically, the item of blending information may be comprised in the encryption key after a predefined period of time has passed.

The encryption keys may further be used for verifying a synchronization of the communication systems, e.g. of the transmitting system and the receiving system. In particular, at least part of the encryption key may be exchanged between the communication systems, e.g. between the transmitting system and the receiving system, in order to verify, at least once, the generating of the encryption key. Specifically, a correct generation of the encryption key may be verified or checked at least once by at least partly exchanging the encryption key between the communication systems.

The method of data transmission between the at least two communication systems specifically may further comprise, e.g. before performing step I., distributing the at least two communication systems. Thus, as an example, the at least two communication systems may be distributed over at least two locations. Specifically, the distributed communication systems may be identical regarding their blending devices and their detectors.

The method may further comprise, specifically before performing step I., providing the same at least two materials to each of the communication systems. Thus, as an example, the method may comprise distributing a first set comprising at least two materials to a first communication system and a second set comprising at least two materials to a second communication system, wherein the first set and the second set each comprise at least one first identical material and each comprise at least one second identical material.

In still further aspects of the present invention, a method of encrypting data and a method of decrypting encrypted data are disclosed. The methods comprise the following method steps, respectively, which will be outlined in further detail below. The method steps specifically may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the methods may comprise additional method steps which are not listed.

The method of encrypting data comprises the following steps:
  a. generating at least one encryption key by using the method according to any one of the preceding claims referring to a method of generating an encryption key; and
  b. encrypting the data by using the encryption key, thereby generating encrypted data.

The method of decrypting encrypted data comprises the following steps:
  A. generating at least one key by using the method according to any one of the preceding claims referring to a method of generating an encryption key; and
  B. decrypting the encrypted data by using the encryption key, thereby generating decrypted data.

For possible definitions, options or embodiments, reference may be made to the description given above.

In a further aspect of the present invention, an encryption key generating device is disclosed. The term "encryption key generating device" as used herein is a broad term and is to be given its ordinary and customary meaning to a person of ordinary skill in the art and is not to be limited to a special or customized meaning. The term specifically may refer, without limitation, to an arbitrary device, such as a computerized device, which is configured for for generating at least one encryption key for encrypting data. The encryption key generating device comprises:
  at least one blending device for blending at least two materials according to at least one item of blending information, thereby generating at least one blend;
  at least one detecting device configured for detecting at least one material property of the blend, the detecting device having at least one detector; and
  at least one transforming device configured for transforming the material property into the encryption key, the transforming device having at least one data processing device configured for applying at least one transformation algorithm to the material property.

For most of the terms, definitions and possible embodiments, reference may be made to the description of the methods given above. The term "detecting device" as used herein is a broad term and is to be given its ordinary and customary meaning to a person of ordinary skill in the art and is not to be limited to a special or customized meaning. The term specifically may refer, without limitation, to an arbitrary device, having at least one detector, wherein the device is configured for detecting the at least one material property as outlined above. The at least one detector may be part of the detecting device or, alternatively, the detecting device may be identical to the at least one detector. In general, however, in most of the cases the detecting device comprises the at least one detector and, additionally, other components, such as one or more computer devices.

The term "transforming device" as used herein also is a broad term and is to be given its ordinary and customary meaning to a person of ordinary skill in the art and is not to be limited to a special or customized meaning. The term specifically may refer, without limitation, to an arbitrary device configured for transforming the material property into the encryption key by using the at least one data processing device. Again, the data processing device configured for applying at least one transformation algorithm to the material property may form part of the transforming device, wherein the transforming device may comprise one or more additional components. Alternatively, however, the transforming device and the data processing device may fully or partially be identical. Generally, the transforming device may fully or partially be embodied as a hardware device. Alternatively, however, the transforming device may also be embodied fully or partially in software.

The encryption key generating device specifically may be configured for performing the method of generating at least one encryption key according to the present invention, such as according to any one of the embodiments disclosed above and/or according to any one of the embodiments disclosed in further detail below. Thus, specifically, the blending device may be configured for performing step i., the detecting device may be configured for performing step ii., and the data processing device may comprise at least one processor, configured to perform method step iii.

As outlined above, various means of blending may be used. Specifically, one or more of the blending devices disclosed above may be applied. More specifically, the blending device may comprise at least one printer, such as an inkjet printer and/or a laser printer. Other types of blending devices and/or printers, however, may also be used.

As further outlined above, various types of detectors may be used in the detecting device, wherein a single detector or a plurality of detectors may be used. The type of detector specifically may be adapted to the at least one material property to be detected. Specifically, however, the detecting device may comprise at least one optical detector, such as an optical detector configured for detecting at least one optical property of the blend, for example at least one scanning device, e.g. at least one optical scanner. The at least one optical detector and/or optical scanner, as an example, may be or may comprise at least one of a color detector, a brightness detector or a spectrometer. The at least one optical detector and/or optical scanner may comprise a single optical detector or a plurality of optical detectors, such as an array of optical detectors.

In a further aspect of the present invention, a printer configured for use as a blending device in the encryption key generating device as described above or as described in further detail below is disclosed. The printer is configured for receiving the at least one item of blending information and for performing at least step i. of the method of generating at least one encryption key for encrypting data, as described above or as described in further detail below. Thus, for most of the terms, definitions and possible embodiments, reference may be made to the description of the methods and devices given above.

The term "printer" as used herein is a broad term and is to be given its ordinary and customary meaning to a person of ordinary skill in the art and is not to be limited to a special or customized meaning. The term specifically may refer, without limitation, to a device configured for applying, e.g. printing, at least one material onto at least one printing surface or substrate, specifically in a patterned fashion, according to at least one printer control information. Thus, typically, the printer may be configured for generating text and/or images on the at least one printing surface according to the at least one printer control information, such as one or more of a string of characters, a bitmapped image, a vector image, a computer program, e.g. provided in at least one printer control language. In particular, the printer, specifically at least one function of the printer, may be controllable via at least one printer control language, such as one or more page description languages (PDLs), printer command languages (PCLs), PostScript, XML Paper Specification and the like.

In particular, the printer may comprise one or more of a drum, such as an image drum; a laser, a lens system, such as a lens system comprising at least one mirror, e.g. a rotatable mirror; a cleaning element, such as a roll, a scraper or similar means for cleaning, e.g. for cleaning the drum; a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printer; a printer control unit configured for controlling the printer.

The printer may specifically be configured for blending the at least two materials according to the at least one item of blending information onto at least one substrate. In particular, the printer may be configured for blending the at least two materials according to the item of blending information, thereby e.g. generating the blend, onto a substrate for receiving the blend.

The substrate may specifically be or may comprise at least one carrier medium, such as a carrier medium selected from the group consisting of: a glass carrier, such as a glass plate or a glass sheet; a plastic carrier, such as a plastic plate or a plastic sheet; a paper carrier, such as a paper sheet; a canvas. Other substrates may be feasible.

Further, the printer may comprise the substrate, e.g. the carrier medium. Thus, as an example, the substrate may be a part of the printer itself or may be embedded within the printer. In particular, the substrate comprised by the printer may be a reusable carrier medium, such as a medium having a cleanable surface, e.g. a drum of the printer, for example a rotating drum.

The printer may further be configured for blending the at least two materials such that at least one pattern, specifically at least one interference pattern, is generated. The at least two materials to be blended by the printer may in particular be different materials, specifically materials being different with respect to at least one property. As an example, the at least two materials to be blended by the printer may differ in at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape.

In particular, the at least two materials to be blended by the printer may comprise at least two materials selected from the group consisting of:
- a powder, specifically a powder selected from the group consisting of:
  - an inorganic powder, specifically an inorganic powder made of a mineral;
  - an organic powder, specifically an organic powder made of a polymer;
  - a pigment;
- a liquid, specifically a liquid selected from the group consisting of a pure liquid, a suspension, an emulsion or a solution, more specifically one or more of a liquid color and an ink.

Specifically, the at least one item of blending information, according to which the printer may be configured for blending the at least two materials, for example, comprises at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of the printer.

The printer may specifically comprise at least one processor, wherein the processor may be configured for controlling at least one printing operation of the printer. Thus, as an example, the printer, specifically when performing step i. of the method of generating at least one encryption key for encrypting data, may be controlled via the at least one processor.

Further, the printer may specifically comprise at least two reservoirs for the at least two materials to be blended. However, further reservoirs may be comprised by the printer, such as reservoirs for multiple, e.g. more than two, materials, e.g. for differently colored powders and/or inks. Thus, as an example, the printer may comprise a plurality of reservoirs, wherein each reservoir may contain at least one material, such as materials having different colors. In particular, each reservoir may contain a material of a specific color, such as black, yellow, cyan and magenta. Other material colors may be feasible. Specifically, additional or alternative material colors.

In particular, the printer may be or may comprise a printer selected from the group consisting of: an inkjet printer, a laser printer, an electrostatic printer, e.g. a liquid ink electrostatic printer. Further, the printer may comprise at least one scanning device, such as at least one optical scanner.

In a further aspect of the present invention, a scanning device configured for use as a detecting device in the encryption key generating device, as described above or as described in further detail below, is disclosed. Further, the scanning device is configured for performing at least step ii. of the method of generating at least one encryption key for encrypting data as described above or as described in further detail below. Thus, for most of the terms, definitions and possible embodiments, reference may be made to the description of the methods and devices given above.

The term "scanning device" as used herein is a broad term and is to be given its ordinary and customary meaning to a person of ordinary skill in the art and is not to be limited to a special or customized meaning. The term specifically may refer, without limitation, to a device configured for detecting at least one property of at least one object and/or element, e.g. of a blend. In particular, the scanning device may be configured for examining and/or detecting at least one material property of the blend. As an example, the scanning device may have at least one scanning element configured for optically recording and/or capturing spatially resolved one-dimensional, two-dimensional or even three-dimensional optical information on the blend. Thus, e.g. for optical detection, the scanning device may, for example, comprise at least one sensor, such as optical sensors, specifically image sensors, e.g. at least one light sensitive capacitor, at least one charge-coupled device (CCD). The scanning device may for example comprise at least one CCD-chip and/or at least one CMOS chip. Specifically, the scanning device may be configured for detecting optical signals of the blend, e.g. of the blended and/or merged powder components, such as by using an optical system. In particular, the scanning system may be configured for convert, e.g. break down, the optical signals of the blend into primary colors, such as into red, green and blue, e.g. by using a prism. The scanning device may specifically be configured for converting the optical signals, such as the optical signals converted into primary colors, into at least one digital image, e.g. by using at least one sensor, such as a sensor comprising a plurality of light-sensitive capacitors. Further, the scanning device may comprise at least one illuminating element, such as an element configured for illuminating the blend, wherein the scanning device may be configured for detecting the at least one property of the blend by using a reflection of the blend. Herein, the scanning device may also be referred to as scanner. The scanning device may specifically be or may comprise a device selected from the group consisting of: a CCD scanner; a CIS scanner; a camera; a film.

In particular, the scanning device may comprise at least one optical detection system, specifically comprising one or more of an optical detector, an image sensor, for example a photomultiplier tube (PMT), e.g. a vacuum tube converting incident photons into an electric signal, a silicon photomultiplier (SiPM), e.g. a solid-state device converting incident photons into an electric signal.

The scanning device may specifically comprise at least one processor, wherein the processor may be configured for controlling at least one scanning operation of the scanning device. Thus, as an example, the scanning device, specifically when performing step ii. and optionally step iii. of the method of generating at least one encryption key for encrypting data, may be controlled via the at least one processor.

The scanning device may specifically be configured for generating at least one item of measurement information on the material property. In particular, the scanning device, when detecting the at least one material property of the blend, such as when the scanning device is used for performing step ii. of the method, the scanning device may generate the at least one item of measurement information on the material property of the blend. In particular, the image, such as the digital image, taken by using the scanning device may comprise at least one binary code, wherein at least a part of the binary code may be used for generating at least a part of the encryption key.

Further, the scanning device may be configured for use as a transforming device in the encryption key generating device. Thus, the scanning device may be configured for performing at least step iii. of the method of generating at least one encryption key for encrypting data. In particular, e.g. when performing step iii. of the method, the scanning device may be configured for subjecting the at least one material property to at least one test. The test may specifically be or may comprise at least one predetermined test. Thus, the scanning device may be configured for subjecting the at least one material property to at least one predetermined test. By subjecting the at least one material property to the at least one test, the encryption key may be generated in accordance with the result of the test. In particular, the scanning device, when subjecting the at least one material property to the at least one test, may generate the at least one encryption key in accordance with the result of the at least one test.

The scanning device may specifically be configured for comparing the at least one material property with at least one threshold value and assigning a number in accordance with the result of the comparison. In particular, the scanning device may be configured for comparing the at least one material property with at least one threshold value and assigning a number in accordance with the result of the comparison, when performing step iii. of the method, thus, when transforming the material property into the encryption key.

Further, the scanning device may be configured for performing steps ii) and/or iii) of the method by scanning, specifically optically scanning, the substrate, e.g. the carrier medium, onto which the printer, specifically the printer as described above or as described in further detail below, blended the at least two materials.

The scanning device may further be configured for being used complementary to the printer, specifically complementary to the printer as described above or as described in further detail below. In particular, the scanning device and the printer in conjunction may be configured for being used as the encryption key generating device as describes above or as described in further detail below.

In still a further aspect of the present invention, a system is disclosed, which, generally, may be configured for data transmission between at least two communication systems. The system comprises at least one first communication system and at least one second communication system. As outlined above, the at least one first communication system at the at least one second communication system, as an example, each may comprise at least one computer. Four possible definitions of the system, of the first communication system and of the second communication system, reference may be made to the description given above. The system is configured for performing the method of data transmission between at least two communication systems according to the present invention, such as according to any one of the embodiments disclosed above and/or according to any one of the embodiments disclosed in further detail below.

Specifically, at least one of the communication systems may comprise at least one data transmission system for transmitting encrypted data and wherein at least another one of the communication systems comprises at least one data receiving system for receiving encrypted data. Consequently, the term "data transmission system" as used herein is a broad term and is to be given its ordinary and customary meaning to a person of ordinary skill in the art and is not to be limited to a special or customized meaning. The term specifically may refer, without limitation, to an arbitrary device or combination of devices configured for transmitting data, such as to a radio transmitter, a network transmitter, a modem, an IR-transmitter, a Bluetooth transmitter or the like. Analogously, the term "data receiving system" as used herein is a broad term and is to be given its ordinary and customary meaning to a person of ordinary skill in the art and is not to be limited to a special or customized meaning. The term specifically may refer, without limitation, to an arbitrary device or combination of devices configured for receiving data, such as a radio receiver, a network receiver, a modem, an IR receiver, a Bluetooth receiver or the like. Again, as discussed above, the roles within the at least two communication systems may be fixedly assigned, by assigning the role of the transmitting system to one of the first and the second communication systems and by assigning the role of the receiving system to the other one of the first and second communication systems. Alternatively, however, the rules may change, e.g. between iterations of data transmission. In the latter case, each of the first and second communication systems may comprise those at least one data transmission system and the at least one data receiving system.

Each of the communications systems, i.e. both the at least one first communication system and the at least one second communication system, each may comprise at least one encryption key generating device according to the present invention, i.e. according to any one of the preceding embodiments and/or according to any one of the subsequently described embodiments referring to an encryption key generating device.

At least one of the communication systems, i.e. the at least one first communication system and/or the at least one second communication system, may further comprise at least one encryption device configured for encrypting the data to be transmitted by using the encryption key, thereby generating encrypted data. The term "encryption device" as used herein is a broad term and is to be given its ordinary and customary meaning to a person of ordinary skill in the art and is not to be limited to a special or customized meaning. The term specifically may refer, without limitation, to an arbitrary device configured for encrypting data. The encryption device specifically may comprise at least one processor configured for performing the encrypting, as outlined above. Thus, the encryption device may fully or partially be embodied in software running on at least one computer.

Further, at least another one of the communication systems may further comprises at least one decryption device configured for decrypting the encrypted data by using the encryption key. The term "decryption device" as used herein is a broad term and is to be given its ordinary and customary meaning to a person of ordinary skill in the art and is not to be limited to a special or customized meaning. The term specifically may refer, without limitation, to an arbitrary device configured for performing the step of decrypting the data. The decryption device specifically may comprise at least one processor configured for performing the decrypting, as outlined above. The decryption device may fully or partially be embodied in software running on at least one computer.

As further outlined above, at least one of the communication systems may comprise the encryption device, and at least another one of the communication systems may comprise the decryption device. Still, one or both of the communication systems may both comprise at least one encryption device and at least one decryption device. Thus, both the at least one first communication system and the at least one second communication system each may comprise at least one encryption device and at least one decryption device. The latter specifically is useful for bidirectional communication and/or data transfer.

In a further aspect, a data encryption system is disclosed. The term "data encryption system" as used herein is a broad term and is to be given its ordinary and customary meaning to a person of ordinary skill in the art and is not to be limited to a special or customized meaning. The term specifically may refer, without limitation, to a device, a combination of devices or a component or combination of components configured for encrypting data. The data encryption system may fully or partially be embodied as a computer or computer system or may be comprised in a computer or computer system. The data encryption system comprises:

- at least one an encryption key generating device according to the present invention, such as according to any one of the embodiments disclosed above or disclosed in further detail below, referring to an encryption key generating device; and
- at least one encryption device configured for encrypting the data by using the encryption key, thereby generating encrypted data.

Instill a further aspect, a data decryption system is disclosed. The term "data decryption system" as used herein is a broad term and is to be given its ordinary and customary meaning to a person of ordinary skill in the art and is not to be limited to a special or customized meaning. The term specifically may refer, without limitation, to a device, a combination of devices or a component or combination of components configured for decrypting data. The data decryption system may fully or partially be embodied as a computer or computer system or may be comprised in a computer or computer system. The data decryption system comprises:

- at least one an encryption key generating device according to any one of the preceding claims referring to an encryption key generating device;
- at least one decryption device configured for decrypting the data by using the encryption key, thereby generating decrypted data.

As outlined above, the methods as disclosed herein may fully or partially be computer-implemented by at least one computer or computer network. Thus, specifically, step iii. may fully or partially be computer-implemented. Further, one or both of steps i. and ii. may also be partially computer-implemented or computer-supported. Similarly, one or more or even all of steps IV., V., VIII. and IX. may fully or partially be computer-implemented or at least computer-supported. One or more or even all of the remaining steps may at least be computer-supported. Consequently, the invention also discloses a computer program and a computer program product having program code means, in order to fully or partially perform or support one or more of the methods according to the present invention in one or more of the embodiments enclosed herein when the computer program product or the computer program is executed on a computer or computer network. Specifically, the program code means may be stored on a computer-readable data carrier and/or on a computer-readable storage medium. As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

The methods, devices and systems according to the present invention provide a large number of advantages over known methods, devices and systems of similar type or purpose. Specifically, the invention may be applied for a protection of confidential information requiring encryption techniques. Unauthorized access to the encrypted data may be prevented or may, at least, be significantly impeded.

The methods, devices and systems specifically address the above-mentioned issue of resources and time for generating the encryption keys. As outlined above, nowadays, as the encryption keys are typically derived by using algorithmic methods, computing power often turns out to be the most crucial factor in the race of information security. In this context, the invention also addresses the issue that, typically, with each new computer generation, the complexity of the encryption keys needs to be increased which, again, typically requires increased computing power. The methods as proposed herein, however, are easily scalable without requiring a significant increase in computational power, since, as an example, an upscale of the number of bits of an encryption key simply requires an upscale of the material properties to be measured and/or an increase of the number of iterations of the method.

The invention specifically may provide for a method of producing encryption keys by taking the advantage of the complexity of the properties of material blends, such as blends of solid particle powders or blends of liquid material such as inks. As an example, in material blends such as solid particle powder blends, do to the high number of particles and due to the different affecting physical effects, the properties of powder mixtures are very difficult to be derived from the properties of their components, even though they are reproducible. Thus, the material properties of the blends are generally affected by an interaction of various effects such as in a direction of mass law, electrostatic, cohesion and the like. Thus, the material properties of the blend are very difficult to simulate or predict, even though these material properties are reproducible by applying the correct item of blending information and detecting the properties in the blend. In most cases, as an example, the properties of particle powder mixtures can only be identified by measurements and cannot be derived from simulation.

In a most simple case, as an example, two or more powder components can be used for encryption, since the blend of these at least two powder components provides for new information, such as new material properties of the blend like density, flowing velocity, color etc. The reproducibility generally, however, requires applying a defined mixing or blending step, as an ensured by providing the at least one item of blending information. The new powder properties of the new blend or mixture can be transferred into binary code numbers which may serve as encryption keys.

The methods, devices and systems according to the present invention also generally lead to highly reproducible encryption and decryption, specifically in case the materials to be blended are well-characterized and well-defined. Further, the steps of blending and detecting also are of importance and should be well-defined. For the blending, the reproducibility is typically ensured by providing the at least one item of blending information. Further, the detecting of the at least one material property should also be performed in accordance with a well-defined procedure, both for encryption and four decryption. Thus, as an example, identical or at least comparable procedures for detecting the at least one material property should be used both in the transmitting system and in the receiving system, as well as in the encryption methods and in the decryption method.

Generally, the methods, devices and systems of the present invention may lead to a pseudorandomized number generating which can be used for generating encryption keys. The encryption key generating can be multiply used in basically any location, in order to generate the same encryption key and/or encrypted or decrypted data, such as by simply applying identical blending and detecting processes at the different locations. Thereby, a pseudo-randomized, non-algorithmic method for generating an encryption key may be provided, specifically for secure data transmittal, secure communication or secure data storage. The materials for blending specifically may be provided by one and the same provider or manufacturer, in order to ensure reproducibility at all locations in which the encrypting method is applied. The materials may be off-the-shelf-materials or may even be or may comprise modified materials which specifically may be custom-tailored for the method of generating the encryption key.

As compared to traditional symmetrical encryption algorithms, the methods, devices and systems of the present invention further address the issue of exchanging the encryption key, specifically in an insecure environment. Thus, in addition to the at least one item of blending information, additional knowledge on the blending process may be required. Thus, a party not authorized to access the data and trying to interfere with the data would still have to obtain the additional background information on knowledge on the blending process. As an example, the unauthorized party might have to obtain additional knowledge on the type of blending device, on the materials to be used or other additional knowledge which might not be part of the at least one item of blending information. Thus, the at least one item of blending information may fully or partially describe the blending process. In case the at least one item of blending information only partially describes blending process, additional background information may be required for all authorized parties. Consequently, as compared to traditional symmetrical keys which are typically exchanged in a single unit, the recipe required for blending and, thus, required for generating the encryption key, may be composed of several parts which may be transmitted or exchanged independently, such as by composing the recipe for blending of the at least one item of blending information and additional information, such as information on the type of blending device, which is only known to the parties. Thereby, even though the unauthorized party might interfere with the at least one item of blending information and might get in possession of the item of blending information, the unauthorized party might still not be enabled to generate the at least one encryption key, specifically in case additional information is required for performing the blending. Thus, the invention might even provide protection against unwanted decryption by brute-force approaches or by application of additional computing resources or even quantum computing, since the encryption as proposed herein provides for the option of generating the encryption key at least partially non-analytically and/or by using other means than simple algorithms for encryption.

Summarizing and without excluding further possible embodiments, the following embodiments may be envisaged:

Embodiment 1: A method of generating at least one encryption key for encrypting data, specifically for data transmission over an insecure channel, the method comprising:

i. blending at least two materials according to at least one item of blending information by using a blending device, thereby generating at least one blend;

ii. detecting at least one material property of the blend by using at least one detector; and iii. transforming the material property into the encryption key by using at least one data processing device configured for applying at least one transformation algorithm to the material property.

Embodiment 2: The method according to the preceding embodiment, wherein step iii. is fully or partially performed in a computer-implemented fashion.

Embodiment 3: The method according to any one of the preceding embodiments, wherein the data comprises digital data.

Embodiment 4: The method according to any one of the preceding embodiments, wherein the data comprises binary data.

Embodiment 5: The method according to any one of the preceding embodiments, wherein the data is subdivided into data packages.

Embodiment 6: The method according to any one of the preceding embodiments, wherein the data comprises error correction data.

Embodiment 7: The method according to any one of the preceding embodiments, wherein the data comprises payload data and control data.

Embodiment 8: The method according to any one of the preceding embodiments, wherein the at least one item of blending information comprises n blending variables, with n being a positive integer, wherein, in step ii., m material properties of the blend are detected, with m being a positive integer.

Embodiment 9: The method according to the preceding embodiment, wherein $m \geq n$.

Embodiment 10: The method according to any one of the preceding embodiments, wherein the at least two materials are different materials, specifically materials being different with respect to at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape.

Embodiment 11: The method according to any one of the preceding embodiments, wherein the at least two materials comprise at least two materials selected from the group consisting of:
  a powder, specifically a powder selected from the group consisting of:
    an inorganic powder, specifically an inorganic powder made of a mineral;
    an organic powder, specifically an organic powder made of a polymer;
    a pigment;
  a liquid, specifically a liquid selected from the group consisting of a pure liquid, a suspension, an emulsion or a solution, more specifically one or more of a liquid color and an ink.

Embodiment 12: The method according to any one of the preceding embodiments, wherein the at least one item of blending information comprises at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of a printer.

Embodiment 13: The method according to any one of the preceding embodiments, wherein the blending device comprises at least two reservoirs for the at least two materials to be blended.

Embodiment 14: The method according to any one of the preceding embodiments, wherein the blending device comprises at least one receiving element for receiving the blend.

Embodiment 15: The method according to the preceding embodiment, wherein the receiving element comprises at least one element selected from the group consisting of: a receiving vessel for receiving the blend; a substrate for receiving the blend.

Embodiment 16: The method according to the preceding embodiment, wherein the substrate comprises a drum having a receiving surface for receiving the blend, specifically a drum on which the blend is temporarily secured electrostatically.

Embodiment 17: The method according to the preceding embodiment, wherein the drum is a rotating drum, wherein the method further comprises at least one cleaning step in which, after detecting the at least one material property, the blend is removed from the receiving surface of the drum.

Embodiment 18: The method according to any one of the preceding embodiments, wherein the blending device comprises at least one blending element for generating the blend, specifically at least one blending element selected from the group consisting of: a dispenser for continuously or discontinuously dispensing at least one of the two materials; a printer for printing the at least two materials onto at least one receiving element, specifically onto at least one substrate, specifically at least one printer selected from the group consisting of: an inkjet printer, a laser printer.

Embodiment 19: The method according to any one of the preceding embodiments, wherein the at least one material property comprises at least one of a physical property of the blend and a chemical property of the blend.

Embodiment 20: The method according to any one of the preceding embodiments, wherein the at least one material property comprises at least one property selected from the group consisting of: a specific density of the blend; a volume of the blend; a weight of the blend; an optical property of the blend; a color of the blend; a spectral composition of the blend, specifically a color spectrum of the blend; a color intensity of the blend; a viscosity of the blend.

Embodiment 21: The method according to any one of the preceding embodiments, wherein the step of detecting the at least one material property of the blend comprises generating at least one item of measurement information on the material property.

Embodiment 22: The method according to any one of the preceding embodiments, wherein the transforming of the material property into the encryption key comprises subjecting the at least one material property to at least one test, specifically to at least one predetermined test, wherein the encryption key is generated in accordance with the result of the test.

Embodiment 23: The method according to any one of the preceding embodiments, wherein the transforming of the material property into the encryption key comprises comparing the at least one material property with at least one threshold value and assigning a number in accordance with the result of the comparison.

Embodiment 24: The method according to the preceding embodiment, wherein the number is a binary number.

Embodiment 25: A method of data transmission between at least two communication systems, specifically for data transmission over an insecure channel, the method comprising:
I. assigning the role of a transmitting system to at least one of the communication systems;
II. assigning the role of a receiving system to at least another one of the communication systems;
III. providing at least one item of blending information both to the transmitting system and to the receiving system;
IV. generating, by the transmitting system, at least one encryption key by using the at least one item of blending information and the method according to any one of the preceding embodiments referring to a method of generating at least one encryption key;
V. encrypting, by the transmitting system, the data to be transmitted by using the encryption key, thereby generating encrypted data;
VI. transmitting, by the transmitting system, the encrypted data to the receiving system;
VII. receiving, by the receiving system, the encrypted data;
VIII. generating, by the receiving system, the at least one encryption key by using the at least one item of blending information and the method according to any one of the preceding embodiments referring to a method of generating at least one encryption key; and
IX. decrypting, by the receiving system, the encrypted data by using the encryption key.

Embodiment 26: The method according to the preceding embodiment, wherein the method is performed iteratively.

Embodiment 27: The method according to the preceding embodiment, wherein, in the iterations, the roles of the transmitting system and of the receiving system are reassigned.

Embodiment 28: The method according to any one of the two preceding embodiments, wherein, in at least one of the iterations, in step III., at least one item of blending information is provided for at least one subsequent iteration.

Embodiment 29: The method according to the preceding embodiment, wherein the at least one item of blending information is fully or partially comprised in one or both of the encryption key and the data.

Embodiment 30: The method according to any one of the preceding embodiments referring to method of data transmission between at least two communication systems, the method further comprising, specifically before performing step I., distributing the at least two communication systems.

Embodiment 31: The method according to the preceding embodiment, wherein the distributed communication systems are identical regarding their blending devices and their detectors.

Embodiment 32: The method according to any one of the two preceding embodiments, wherein the method further comprises, specifically before performing step I., providing the same at least two materials to each of the communication systems.

Embodiment 33: A method of encrypting data, the method comprising:
a. generating at least one encryption key by using the method according to any one of the preceding embodiments referring to a method of generating an encryption key; and
b. encrypting the data by using the encryption key, thereby generating encrypted data.

Embodiment 34: A method of decrypting encrypted data, the method comprising:
  A. generating at least one key by using the method according to any one of the preceding embodiments referring to a method of generating an encryption key; and
  B. decrypting the encrypted data by using the encryption key, thereby generating decrypted data.

Embodiment 35: An encryption key generating device for generating at least one encryption key for encrypting data, comprising:
  at least one blending device for blending at least two materials according to at least one item of blending information, thereby generating at least one blend;
  at least one detecting device configured for detecting at least one material property of the blend, the detecting device having at least one detector; and
  at least one transforming device configured for transforming the material property into the encryption key, the transforming device having at least one data processing device configured for applying at least one transformation algorithm to the material property.

Embodiment 36: The encryption key generating device according to the preceding embodiment, wherein the encryption key generating device is configured for performing the method of generating at least one encryption key according to any one of the preceding embodiments referring to a method of generating at least one encryption key.

Embodiment 37: The encryption key generating device according to any one of the two preceding embodiments, wherein the blending device comprises at least one printer.

Embodiment 38: The encryption key generating device according to any one of the three preceding embodiments, wherein the detecting device comprises at least one optical detector, specifically at least one scanning device, such as at least one optical scanner.

Embodiment 39: A printer configured for use as a blending device in the encryption key generating device according to any one of the preceding embodiments referring to an encryption key generating device, wherein the printer is configured for receiving the at least one item of blending information and for performing at least step i. of the method of generating at least one encryption key for encrypting data according to any one of the preceding embodiments referring to a method of generating at least one encryption key for encrypting data.

Embodiment 40: The printer according to the preceding embodiment, wherein the printer comprises one or more of a drum, such as an image drum; a laser, a lens system, such as a lens system comprising at least one mirror, e.g. a rotatable mirror; a cleaning element, such as a roll, a scraper or similar means for cleaning, e.g. for cleaning the drum; a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printer; a printer control unit configured for controlling the printer.

Embodiment 41: The printer according to any one of the preceding embodiments referring to a printer, wherein the printer is configured for blending the at least two materials according to the at least one item of blending information onto at least one substrate, such as onto a substrate for receiving the blend.

Embodiment 42: The printer according to the preceding embodiment, wherein the substrate is at least one carrier medium.

Embodiment 43: The printer according to any one of the two preceding embodiments, wherein the printer further comprises the substrate, e.g. the carrier medium, wherein the substrate is a reusable carrier medium, such as a medium having a cleanable surface, e.g. a drum of the printer, for example a rotating drum.

Embodiment 44: The printer according to any one of the three preceding embodiments, wherein the printer is configured for blending the at least two materials such that at least one pattern, specifically at least one interference pattern, is generated.

Embodiment 45: The printer according to any one of the four preceding embodiments referring to a printer, wherein the at least two materials to be blended by the printer are different materials, specifically materials being different with respect to at least one property.

Embodiment 46: The printer according to any one of the five preceding embodiments, wherein at least one of the at least two materials to be blended by the printer comprises a powder, such as an inorganic powder, an organic powder or a pigment.

Embodiment 47: The printer according to any one of the six preceding embodiments, wherein at least one of the at least two materials to be blended by the printer comprises a liquid, such as a pure liquid, a suspension, an emulsion or a solution.

Embodiment 48: The printer according to any one of the preceding embodiments referring to a printer, wherein the at least one item of blending information, according to which the printer is configured for blending the at least two materials, comprises at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of the printer.

Embodiment 49: The printer according to any one of the preceding embodiments referring to a printer, wherein the printer further comprises at least one processor configured for controlling at least one printing operation of the printer.

Embodiment 50: The printer according to any one of the preceding embodiments referring to a printer, wherein the printer comprises at least two reservoirs for the at least two materials to be blended.

Embodiment 51: The printer according to any one of the preceding embodiments referring to a printer, wherein the printer is selected from the group consisting of: an inkjet printer, a laser printer, an electrostatic printer, e.g. a liquid ink electrostatic printer.

Embodiment 52: The printer according to any one of the preceding embodiments referring to a printer, wherein the printer further comprises at least one scanning device, such as at least one optical scanner.

Embodiment 53: A scanning device configured for use as a detecting device in the encryption key generating device according to any one of the preceding embodiments referring to an encryption key generating device, and wherein the scanning device is configured for performing at least step ii. of the method of generating at least one encryption key for encrypting data according to any one of the preceding embodiments referring to a method of generating at least one encryption key for encrypting data.

Embodiment 54: The scanning device according to the preceding embodiment, wherein the scanning device is configured for generating at least one item of measurement information on the material property, specifically when detecting the at least one material property of the blend.

Embodiment 55: The scanning device according to any one of the preceding embodiments referring to a scanning device, wherein the scanning device further is configured for use as a transforming device in the encryption key generating device, and wherein the scanning device is configured for performing at least step iii. of the method of generating at least one encryption key for encrypting data according to any one of the preceding embodiments referring to a method of generating at least one encryption key for encrypting data.

Embodiment 56: The scanning device according to the preceding embodiment, wherein the scanning device is configured for subjecting the at least one material property to at least one test, specifically to at least one predetermined test, wherein the encryption key is generated in accordance with the result of the test, specifically when transforming the material property into the encryption key.

Embodiment 57: The scanning device according to any one of the two preceding embodiments, wherein the scanning device is configured for comparing the at least one material property with at least one threshold value and assigning a number in accordance with the result of the comparison, specifically when transforming the material property into the encryption key.

Embodiment 58: The scanning device according to any one of the three preceding embodiments, wherein the scanning device is configured for performing steps ii. and/or iii. of the method by scanning, specifically optically scanning, the substrate, e.g. the carrier medium, onto which the printer, specifically the printer according to any one of the preceding embodiments referring to a printer, blended the at least two materials.

Embodiment 59: The scanning device according to the preceding embodiment, wherein the scanning device comprises at least one optical detection system, specifically comprising one or more of an optical detector, an image sensor, for example a photomultiplier tube (PMT), e.g. a vacuum tube converting incident photons into an electric signal, a silicon photomultiplier (SiPM), e.g. a solid-state device converting incident photons into an electric signal.

Embodiment 60: The scanning device according to any one of the preceding embodiments referring to a scanning device, wherein the scanning device further comprises at least one processor configured for controlling at least one scanning operation of the scanning device.

Embodiment 61: The scanning device according to any one of the preceding embodiments referring to a scanning device, wherein the scanning device is configured for being used complementary to the printer according to any one of the preceding embodiments referring to a printer, specifically the scanning device and the printer in conjunction are configured for being used as the encryption key generating device.

Embodiment 62: A system comprising at least one first communication system, at least one second communication system, the system being configured for performing the method of data transmission between at least two communication systems according to any one of the preceding embodiments referring to a method of data transmission between at least two communication systems.

Embodiment 63: The system according to the preceding embodiment, wherein at least one of the communication systems comprises at least one data transmission system for transmitting encrypted data and wherein at least another one of the communication systems comprises at least one data receiving system for receiving encrypted data.

Embodiment 64: The system according to any one of the two preceding embodiments, wherein each of the communications systems comprises at least one encryption key generating device according to any one of the preceding embodiments referring to an encryption key generating device.

Embodiment 65: The system according to the preceding embodiment, wherein at least one of the communication systems further comprises at least one encryption device configured for encrypting the data to be transmitted by using the encryption key, thereby generating encrypted data.

Embodiment 66: The system according to the preceding embodiment, wherein at least another one of the communication systems further comprises at least one decryption device configured for decrypting the encrypted data by using the encryption key.

Embodiment 67: A data encryption system, comprising:
at least one an encryption key generating device according to any one of the preceding embodiments referring to an encryption key generating device;
at least one encryption device configured for encrypting the data by using the encryption key, thereby generating encrypted data.

Embodiment 68: A data decryption system, comprising:
at least one an encryption key generating device according to any one of the preceding embodiments referring to an encryption key generating device;
at least one decryption device configured for decrypting the data by using the encryption key, thereby generating decrypted data.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
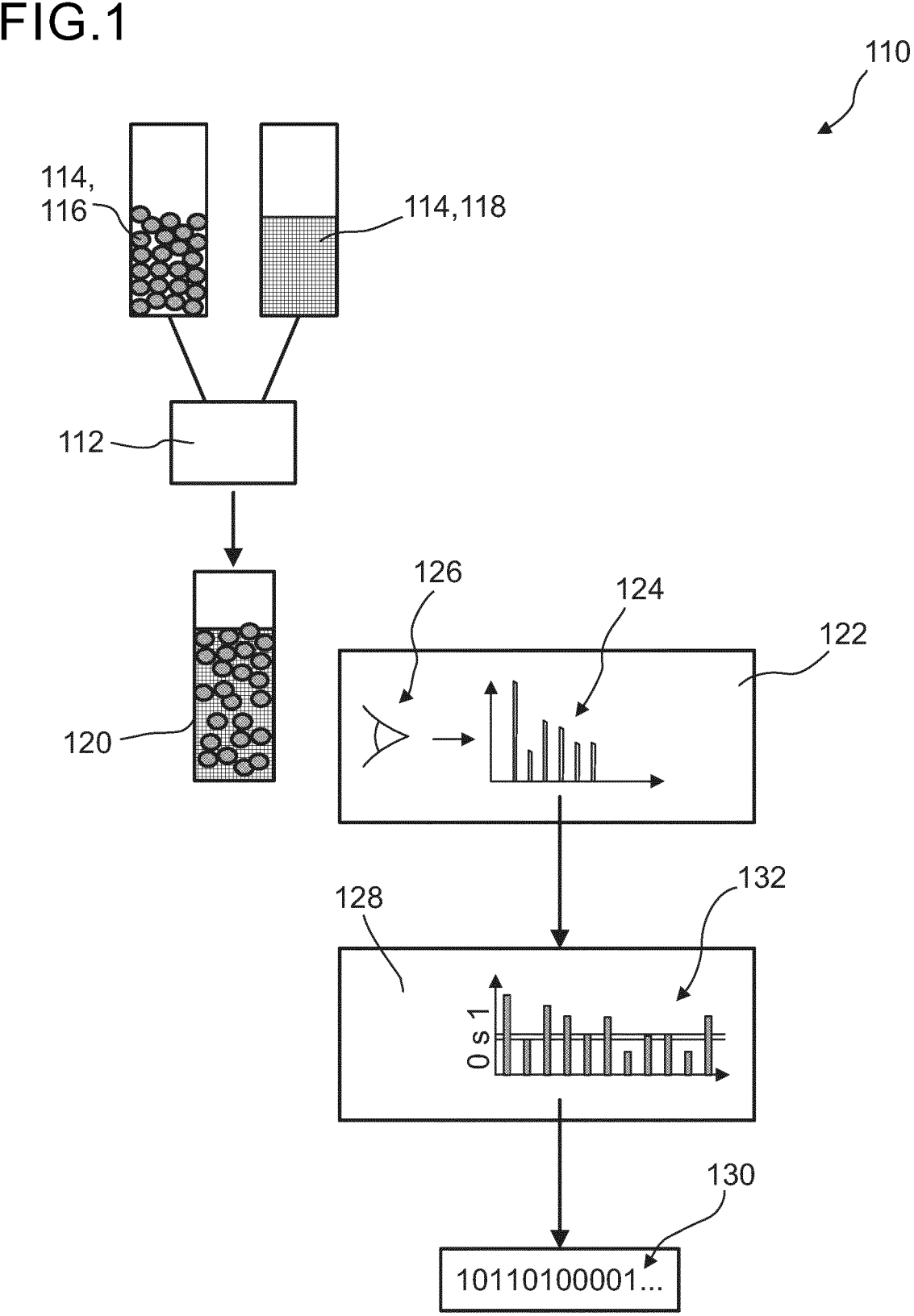
FIGS. 1 and 2 show different embodiments of encryption key generating devices.

In FIG. 1 a schematic illustration of an embodiment of an encryption key generating device 110 is shown. The encryption key generating device 110 comprises one blending device 112 for blending at least two materials 114, specifically at least a first material 116 and a second material 118, according to at least one item of blending information, thereby generating at least one blend 120. Further, the encryption key generating device 110 comprises a detecting device 122 configured for detecting at least one material property 124 of the blend 120. The detecting device 122 has at least one detector 126. In addition, the encryption key generating device 110 comprises at least one transforming device 128 configured for transforming the material property 124 into the encryption key 130. The transforming device 128 has at least one data processing device 132 configured for applying at least one transformation algorithm to the material property 124. The transforming of the material property 124 into the encryption key 130 may specifically comprise comparing the at least one material property 124 with at least one threshold value s and assigning a number, for example a binary number, in accordance with the result of the comparison.

Figure 2:
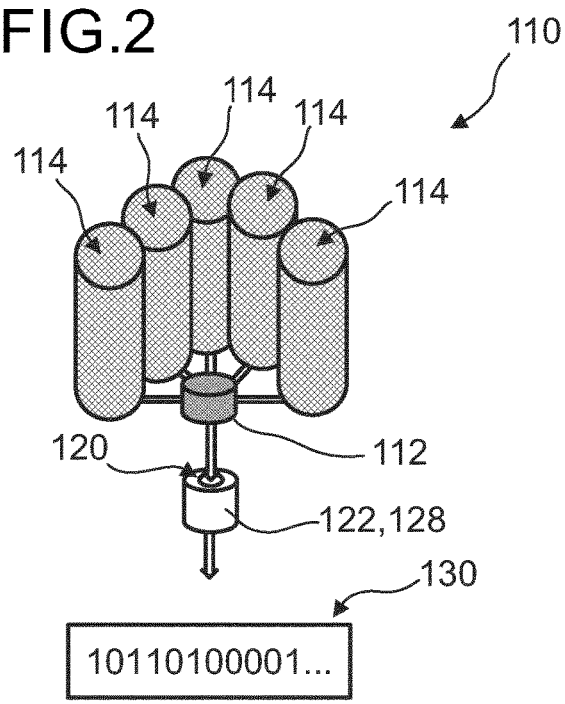

FIG. 2 illustrates a different embodiment of an encryption key generating device 110. Therein five materials 114 may be blended by a blending device 112 according to an item of blending information, generating the at least one blend 120. The detecting device 122 and the transforming device 128 may be integrally formed, detecting and transforming the material property 124 of the blend 120 into an encryption key 130.

Figure 3:
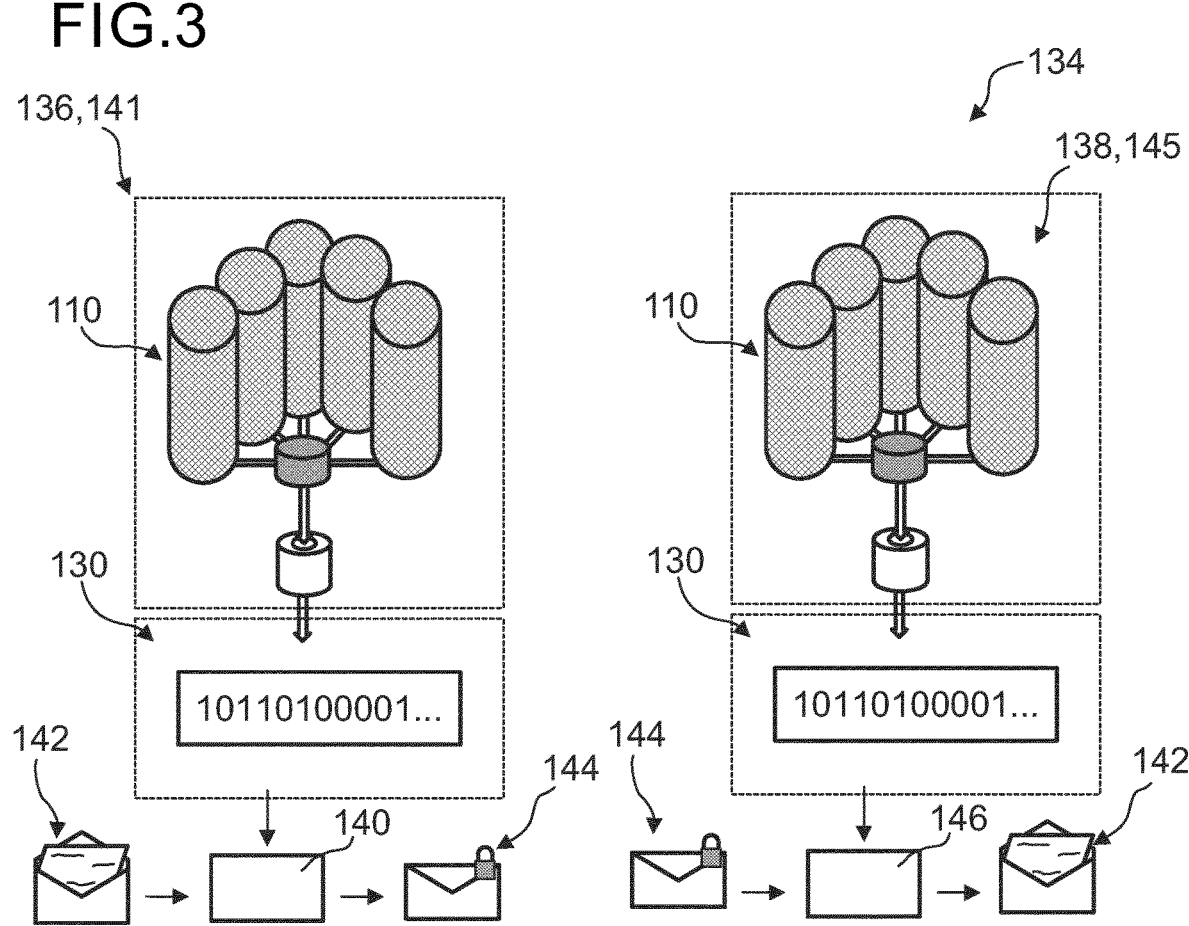
FIG. 3 shows an embodiment of a system.

In FIG. 3 an embodiment of a system 134 is illustrated. The system 134 comprises at least one first communication system 136 and at least one second communication system 138. Each of the communication systems 136, 138 may comprise an encryption key generating device 110. The first communication system 136, specifically a transmitting system 141, may comprise at least one encryption device 140 configured for encrypting data 142 to be transmitted by using the encryption key 130, thereby generating encrypted data 144. The terms transmitting system 141 and transmission system may be used interchangeably and may specifically refer to the same system. The second communication system 138, specifically a receiving system 145, may comprise at least one decryption device 146 configured for decrypting the encrypted data 144 by using the encryption key 130.

Figure 4:
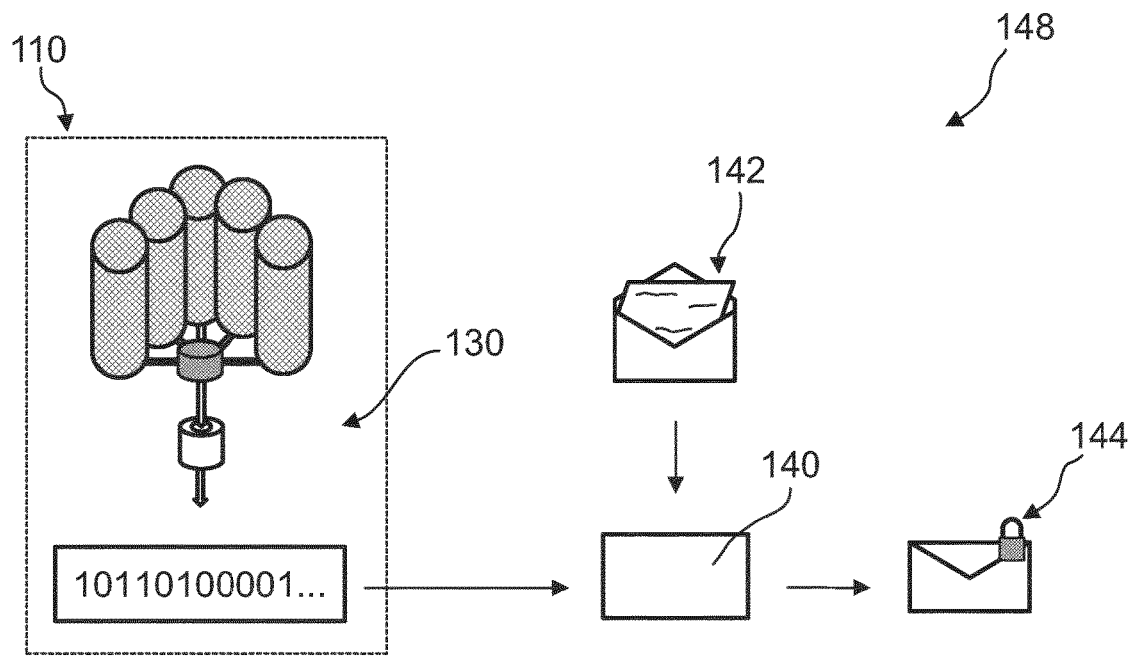
FIG. 4 shows an embodiment of a data encryption system.

FIG. 4 shows an embodiment of a data encryption system 148 comprising the at least one encryption key generating device 110. Further, the data encryption system 148 comprises the at least one encryption device 140 which may be configured for encrypting the data 142 to be transmitted by using the encryption key 130, thereby generating the encrypted data 144.

Figure 5:
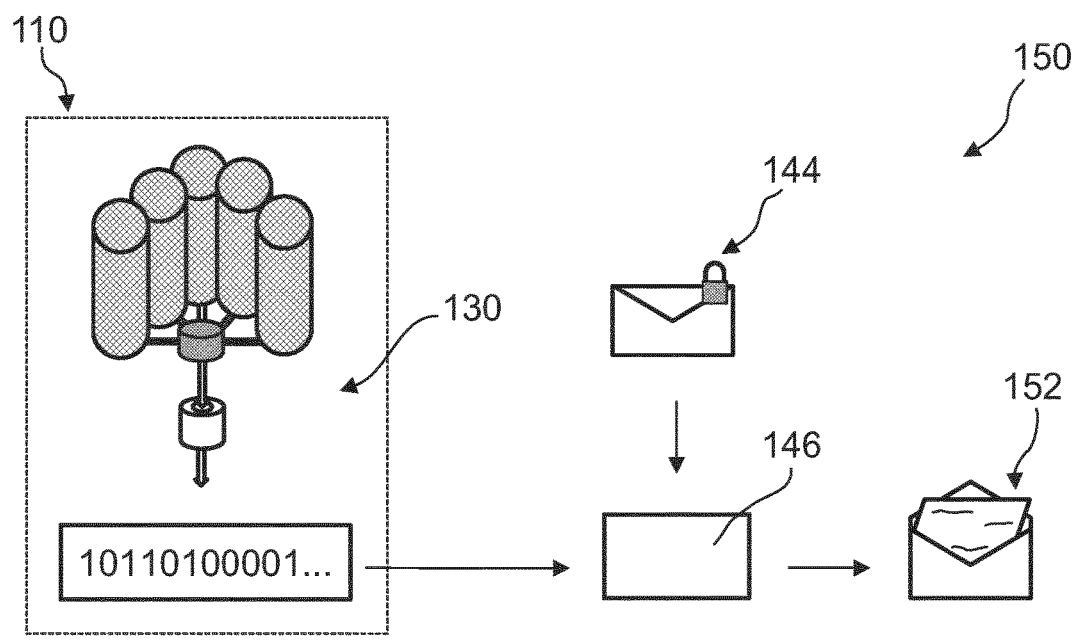
FIG. 5 shows an embodiment of a data decryption system.

FIG. 5 shows an embodiment of a data decryption system 150 comprising the at least one encryption key generating device 110. Further, the data decryption system 150 comprises the at least one decryption device 146 configured for decrypting the data, specifically the encrypted data 144, by using the encryption key 130, thereby generating decrypted data 152, such as for example the data 142.

Figure 6:
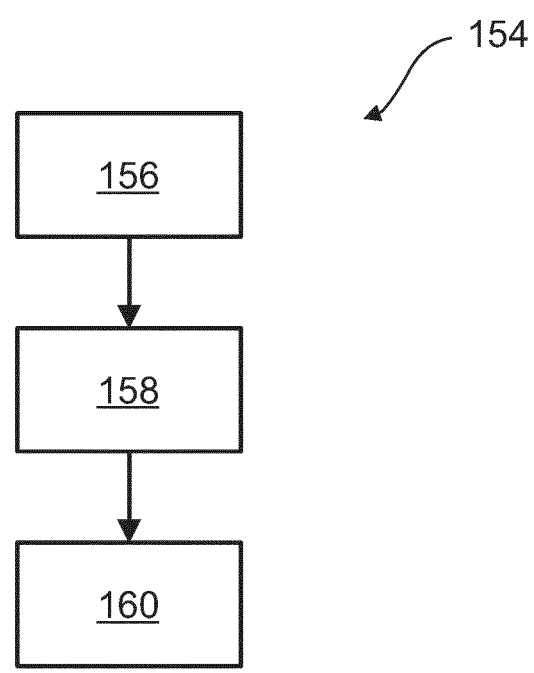
FIG. 6 shows a flow chart of an embodiment of a method of generating at least one encryption key for encrypting data.

The encryption key generating device 110, as for example illustrated in FIGS. 1 and 2, may be configured for performing a method 154 of generating at least one encryption key 130. FIG. 6 shows a flow chart of an embodiment of a method 154 of generating at least one encryption key 130 for encrypting data 142. The method 154 comprises the following steps, which may specifically be performed in the given order. Still, a different order may also be possible. It may be possible to perform two or more of the method steps fully or partially simultaneously. It may further be possible to perform one, more than one or even all of the method steps once or repeatedly. The method may comprise additional method steps which are not listed herein. The method steps of the method 154 of generating at least one encryption key 130 for encrypting data 142 are the following:

- step i. (denoted with reference number 156) blending at least two material 114 according to at least one item of blending information by using a blending device 112, thereby generating at least one blend 120;
- step ii. (denoted with reference number 158) detecting at least one material property 124 of the blend 120 by using at least one detector 126; and
- step iii. (denoted with reference number 160) transforming the material property 124 into the encryption key 130 by using at least one data processing device 132 configured for applying at least one transformation algorithm to the material property 124.

Figure 7:
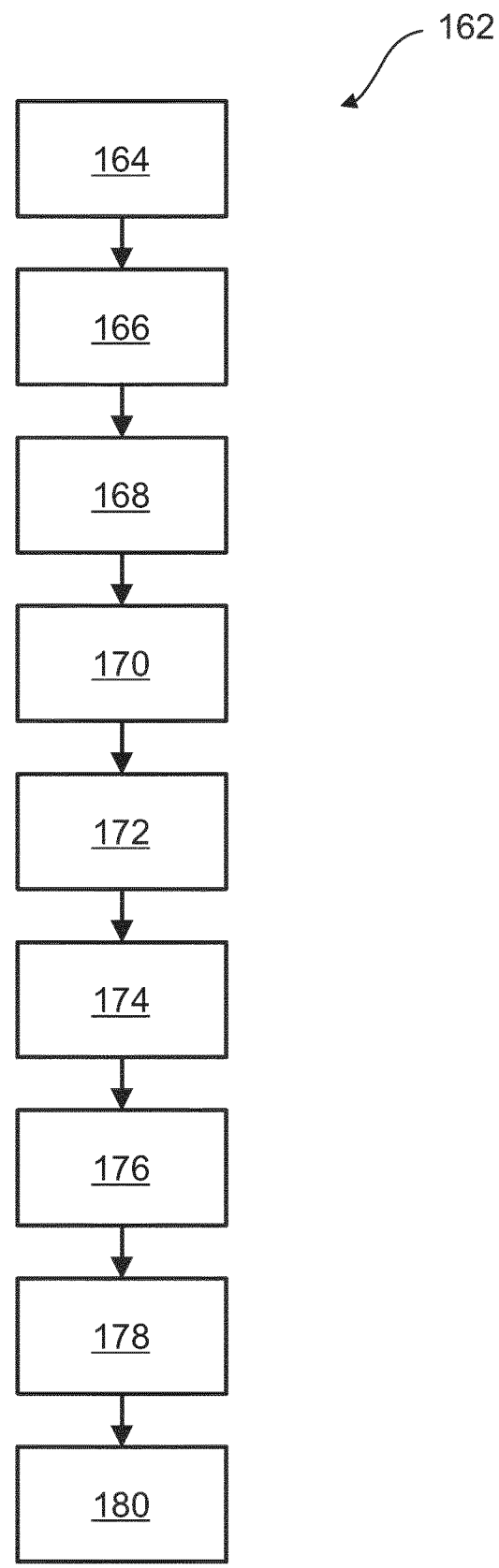
FIG. 7 shows a flow chart of an embodiment of a method of data transmission between at least two communication systems.

The system 134, as for example illustrated in FIG. 3, is configured for performing a method 162 of data transmission between at least two communication systems 136, 138. FIG. 7 shows a flow chart of an embodiment of the method 162 of data transmission between at least two communication systems 136, 138. The method 162 comprises the following steps, which may specifically be performed in the given order. Still, a different order may also be possible. It may be possible to perform two or more of the method steps fully or partially simultaneously. It may further be possible to perform one, more than one or even all of the method steps once or repeatedly. The method may comprise additional method steps which are not listed herein. The method steps of the method 162 of data transmission between at least two communication systems 136, 138 are the following:

- step I. (denoted with reference number 164) assigning the role of a transmitting system 141 to at least one of the communication systems 136, 138;
- step II. (denoted with reference number 166) assigning the role of a receiving system 145 to at least another one of the communication systems 136, 138;
- step III. (denoted with reference number 168) providing at least one item of blending information both to the transmitting system 141 and to the receiving system 145;
- step IV. (denoted with reference number 170) generating, by the transmitting system 141, at least one encryption key 130 by using the at least one item of blending information and the method 154 of generating at least one encryption key 130;
- step V. (denoted with reference number 172) encrypting, by the transmitting system 141, the data 142 to be transmitted by using the encryption key 130, thereby generating encrypted data 144;
- step VI. (denoted with reference number 174) transmitting, by the transmitting system 141, the encrypted data 144 to the receiving system 145;

step VII. (denoted with reference number 176) receiving, by the receiving system 145, the encrypted data 144;

step VIII. (denoted with reference number 178) generating, by the receiving system 145, the at least one encryption key 130 by using the at least one item of blending information and the method 154 of generating at least one encryption key 130; and step IX. (denoted with reference number 180) decrypting, by the receiving system 145, the encrypted data 144 by using the encryption key 130.

Figure 8:
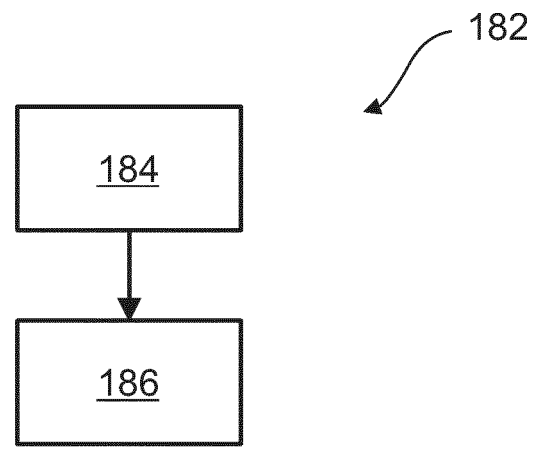
FIG. 8 shows a flow chart of an embodiment of a method of encrypting data.

In FIG. 8 a flow chart of an embodiment of a method 182 of encrypting data is illustrated. The method 182 comprises the following steps, which may specifically be performed in the given order. It may be possible to perform one or more of the method steps once or repeatedly. The method may comprise additional method steps which are not listed herein. The method steps of the method 182 of encrypting data are the following:

step a. (denoted with reference number 184) generating at least one encryption key 130 by using the method 154 of generating at least one encryption key 130; and step b. (denoted with reference number 186) encrypting the data 142 by using the encryption key 130, thereby generating encrypted data 144.

Figure 9:
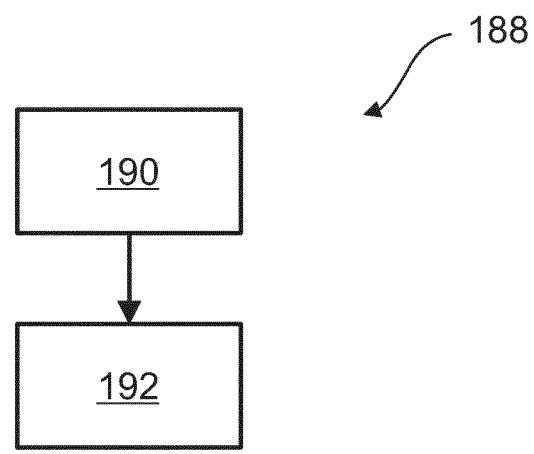
FIG. 9 shows a flow chart of an embodiment of a method of decrypting data.

FIG. 9 shows a flow chart of an embodiment of a method 188 of decrypting data. The method 188 comprises the following steps, which may specifically be performed in the given order. It may be possible to perform one or more of the method steps once or repeatedly. The method may comprise additional method steps which are not listed herein. The method steps of the method 188 of decrypting data are the following:

step A. (denoted with reference number 190) generating at least one key 130 by using the method 154 of generating an encryption key 130; and step B. (denoted with reference number 192) decrypting the encrypted data 144 by using the encryption key 130, thereby generating decrypted data 152.

Figure 10:
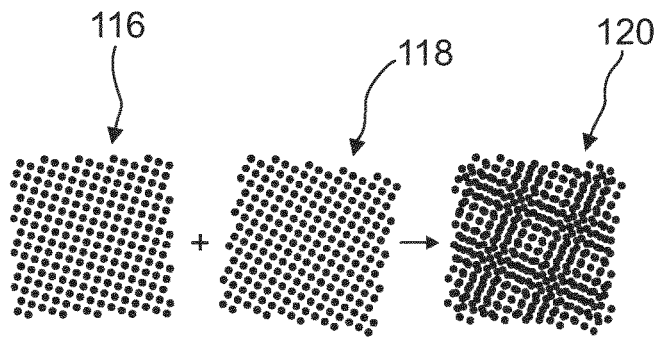
FIG. 10 shows an embodiment of a process of blending at least two materials such that at least one pattern is generated.

FIG. 10 shows an embodiment of blending at least two materials such that at least one pattern is generated. In particular, the figure may show an example of generating a pattern, such as an interference pattern, when blending a first material 116 and a second material 118 into at least one blend 120. Specifically, when using a printer 194, e.g. exemplarily illustrated in FIGS. 11 and 12, the first material 116 may be applied onto at least one substrate 196, such as onto a drum 198 and/or onto a sheet of paper 200. For example, the pattern may specifically be generated by using differently tilted raster images. Thus, in particular, a raster image generated with the second material 118 may be tilted with respect to a raster image generated with the first material 116, for example by a printer control unit 202. As exemplarily illustrated in FIG. 10, blending the two materials, such as overlaying the raster images generated with the first material 116 and the second material 118 respectively, may result in a pattern within the blend 120.

Figure 11:
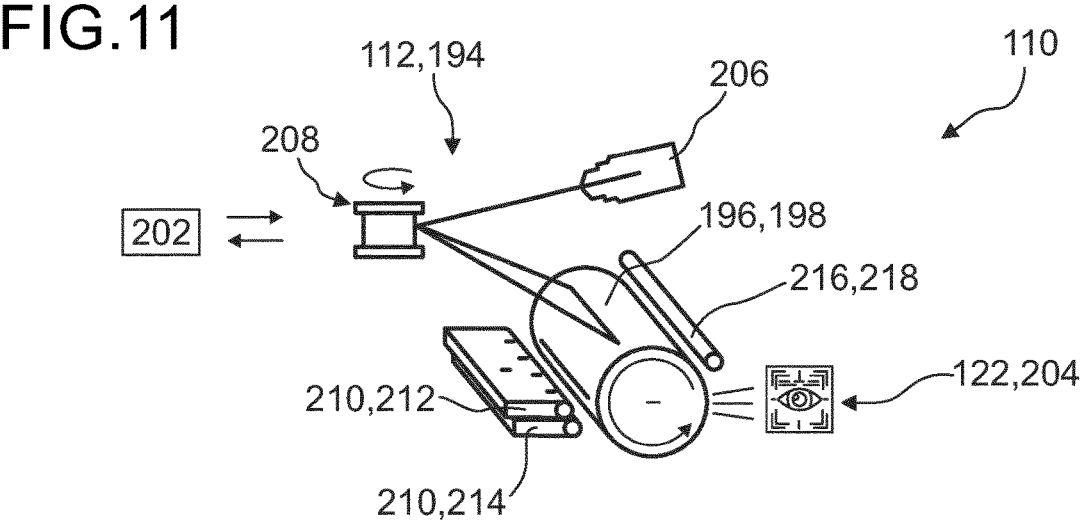
FIG. 11 shows an embodiment of an encryption key generating device in a perspective view.

Such a pattern within the blend 120 may specifically be generated by using a printer 194 such as exemplarily illustrated in FIG. 11. In particular, FIG. 11 shows an embodiment of an encryption key generating device 110 in a perspective view. The encryption key generating device 110 may specifically comprise a printer 194 configured for use as a blending device 112, and may further comprise a scanning device 204 configured for use as a detecting device 122. The printer 194 is configured for performing at least step i. of the method of generating at least one encryption key for encrypting data. The printer 194 may be or may comprise a laser printer, wherein at least one laser 206 and at least one rotating mirror 208 may be used for printing, e.g. blending, the at least two materials 114 contained in at least two reservoirs 210 onto the drum 198. Specifically, the first material 116 may be contained in a first reservoir 212 and the second material 118 may be contained in a second reservoir 214.

The scanning device 204 is configured for performing at least step ii. of the method of generating at least one encryption key for encrypting data. Further, the scanning device 204 may be used for detecting the pattern within the blend 120, e.g. by optically scanning the blend 120 printed onto the drum 198. Thus, the scanning device 204 may be configured for generating at least one item of measurement information, e.g. from the pattern. Additionally, the scanning device 204 may be configured for performing at least step iii. of the method, e.g. by transforming the pattern into an encryption key 130. Further, the printer 194 may comprise a cleaning element 216, such as a cleaning roll 218, e.g. for cleaning the substrate 196, specifically for removing the blend 120 from the drum 198. Thus, as an example, the cleaning element 216 may be configured for preparing the drum 198 for further printing, such as to be ready for carrying a next blend 120.

In particular, for generating the blend, e.g. an image, to be usable for generating at least one encryption key for encrypting data, the drum 198 may be coated in the laser printer with at least two printer powders, wherein these powders may be blended such as to create the pattern, e.g. a specific pattern. The pattern may specifically be created by using the printer control unit 202 for controlling a raster image processor (RIP) of the printer 194. In particular, the raster image processor of the printer 194 may be controlled such as to convert a brightness gradation of the printed matter into a different grid of tiny dots for each material 114, thereby, for example, tilting a raster image generated with the second material 118 with respect to a raster image generated with the first material 116. Specifically, as an example, the RIP may be controlled according to the item of blending information.

Figure 12:
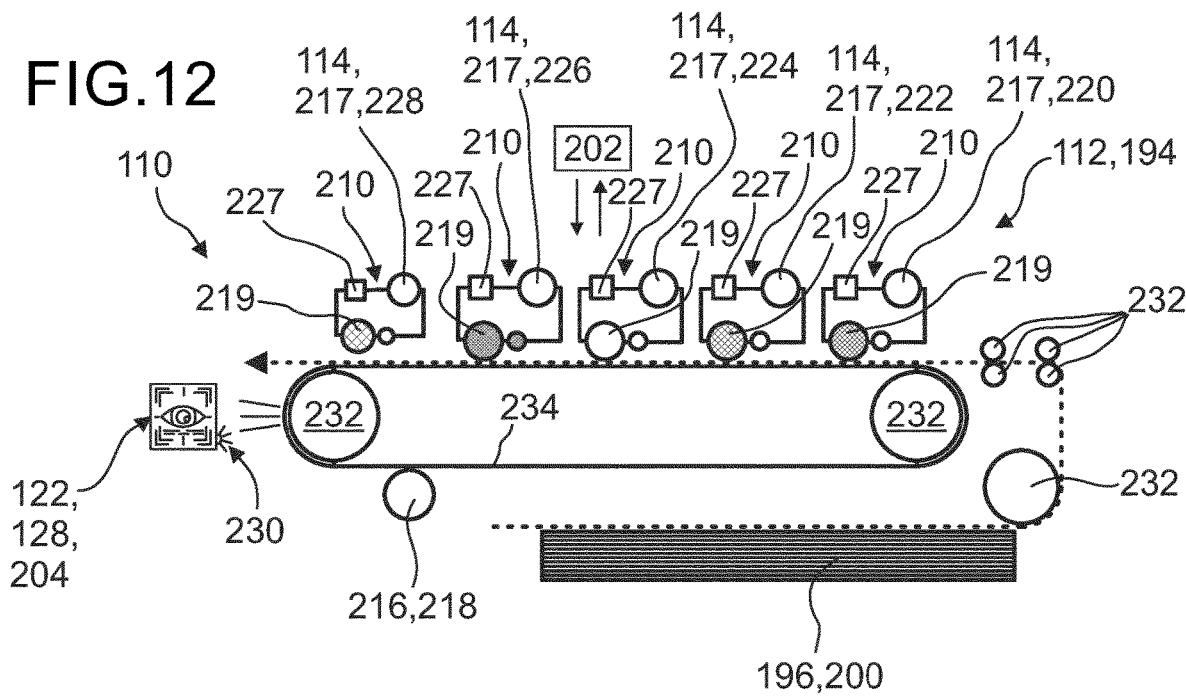
FIG. 12 shows a schematic illustration of an embodiment of an encryption key generating device.

In FIG. 12, a schematic illustration of an embodiment of an encryption key generating device 110 is shown. The encryption key generating device 110 may specifically comprise as at least one printer 194 for the at least one blending device 112. Further, the encryption key generating device 110 may comprise at least one scanning device 204 for the at least one detecting device 122 and, e.g. additionally, for the at least one transforming device 128. As an example, the printer 194 may comprise a plurality of reservoirs 210, each reservoir 210 comprising at least one material 114, wherein each material 114 may be different from all other materials 114. In particular, the printer 194 may comprise a standard color laser cartridge, e.g. having "CMYK" toner colors. Thus, as an example, the printer 194 may comprise five reservoirs 210, wherein each reservoir 210 may comprise a material 114 having a different color, such as a cyan 220, a magenta 222, a yellow 224, and a black 226 colored material, e.g. a toner 217. Further, each reservoir may comprise at least one image roll 219 and at least one laser 227. Additionally or alternatively, the printer 194 may comprise at least one effect material 228, such as one or more of a reflective material, a fluorescent material, a material having an optically detectable reaction with one or more other materials, such as with one or more of the "CMYK" colored materials. In particular, by using a plurality of materials 114 a complexity of the encryption key 130 may be increased.

The scanning device 204 may further comprise at least one illuminating element 230, such as an element configured for illuminating the blend 120. Specifically, the scanning device 204 may be configured for detecting the at least one property of the blend 120 by using a reflection of the blend 120. Thus, as an example, a complexity of the encryption key 130 may be increased by using optical effects, such as a special reflection, e.g. by using effect materials 228, when scanning the blend 120 using the scanning device 204 with the illuminating element 230.

Further, controlling the printer 194, e.g. by the printer control unit 202, raster images may be varied, for example creating specific patterns and/or colors. Specifically, small amendments in the item of blending information, such as for example implementing changes only in the printer control unit 202 while keeping previously used materials, may result in new color images. Thus, specifically, a position of the deposition of the materials may be shifted, e.g. by a defined distance for some of the color components, which may lead to an image wherein previously blue or red areas may be amended into green or orange areas.

As illustrated in FIG. 12, the printer 194 may further comprise at least one transporting element, such as a roller 232 and/or conveyor 234, e.g. for feeding, transferring and/or ejecting the substrate 196, specifically the paper 200, into, within and/or from the printer 194. Furthermore, the conveyor 234 itself can be also used as substrate 196 to transport the blend 120, e.g. the printed color image, to the scanning device 204. The cleaning element 216 may further be used to clean the conveyor 234, specifically after the blend 120 passed the scanning device. Thus, as an example, the conveyor 234 may function as a transfer belt. In particular, the blend 120 may be printed onto the conveyor 234 and may then be transported by the conveyor 234 to the scanning device 204, such that the scanning device 204 may detect the at least one property of the blend 120. The conveyor 234 may then be configured to move the blend 120, specifically after passing the scanner, to the cleaning element 216 where the conveyor 234 may be cleaned, e.g. where the blend 120, e.g. the color image, may be removed from the conveyor 234. Thus, in case the conveyor 234 is used as the substrate 196, no paper 200 may be transported, e.g. as opposed to the printer 194 being in a normal printer mode. Specifically, in this case, the scanning device 204 may be arranged behind a paper ejection, as is exemplarily illustrated in FIG. 12.

The encryption key generating device 110, e.g. the printer 194 in conjunction with the scanning device 204, may be configured for generating the at least one encryption key 130 for encrypting data. As an example, for data communication, specifically secure communication, over an insecure channel, e.g. between at least two communication systems 136, 138, each communication system 136, 138 may comprise at least one encryption key generating device 110. Thus, each communication system 136, 138 may for example comprise the at least one printer 194 and the at least one scanning device 204, wherein in each communication system 136, 138 the printer 194 and the scanner 204 may generate the same encryption key 130 to be used for encrypting and/or decrypting the data 142. In particular, in each communication system 136, 138 the printer 194 and the scanner 204 may generate the encryption key 130 by using identical materials 114, e.g. printer powders, according to the item of blending information, such as according to the same printing instructions and/or using identical information for controlling the printer 194, such as the printer control unit 202, e.g. the RIP of the printer 194.

In particular, for encrypting and decrypting data for a data communication, e.g. for secure communication, all of the involved communication systems 136, 138 may comprise identical printer 194 and identical scanning devices 204, such as identical in both hardware, e.g. identical laser printers and/or identical optical scanners, and software, e.g. used for controlling the printer 194 and/or the scanning device 204, such as identically programmed printer control units 202, e.g. RIPs.

A security of the communication may be increased by amending and/or changing the encryption key 130. Thus, as an example, the item of blending information may be varied and/or amended regularly. For example, the software, e.g. used for controlling the printer 194 and/or the scanning device 204, may be subjected to synchronous adjustments in predefined time intervals, wherein the materials 114 to be blended may be exchanged and/or amended according to information transferred via an external communication. Additionally or alternatively, the software may synchronously be amended according to an algorithm, wherein the materials 114 may be exchanged and/or amended due to information comprised within transferred encrypted data 144, such as within an appendix of the transferred encrypted data 144.

Specifically, the data, e.g. the data 142 to be encrypted, may be encrypted by being transformed and/or converted into an image, such as into an image format, e.g. into an image format printable by the printer 194. In particular, the item of blending information, for example comprising printing instructions as well as adaptations for controlling the printer 194, e.g. RIP adaptations, may be transmitted together with the encrypted data 144.

LIST OF REFERENCE NUMBERS 110 encryption key generating device
112 blending device
114 material
116 first material
118 second material
120 blend
122 detecting device
124 material property
126 detector
128 transforming device
130 encryption key
132 data processing device
134 system
136 first communication system
138 second communication system
140 encryption device
141 transmitting system
142 data
144 encrypted data
145 receiving system
146 decryption device
148 data encryption system
150 data decryption system
152 decrypted data
154 method of generating at least one encryption key
156 step i.
158 step ii.
160 step iii.
162 method of data transmission between at least two communication systems
164 step I.
166 step II.

168 step III.
170 step IV.
172 step V.
174 step VI.
176 step VII.
178 step VIII.
180 step IX.
182 method of encrypting data
184 step a.
186 step b.
188 method of decrypting data
190 step A.
192 step B.
194 printer
196 substrate
198 drum
200 paper
202 printer control unit
204 scanning device
206 laser
208 rotating mirror
210 reservoir
212 first reservoir
214 second reservoir
216 cleaning element
217 toner
218 cleaning roll
219 image roll
220 cyan
222 magenta
224 yellow
226 black
227 laser
228 effect material
230 illuminating element
232 roller
234 conveyor

The invention claimed is:

1. A method of generating at least one encryption key for encrypting data, specifically for data transmission over an insecure channel, the method comprising:
   i. blending at least two materials according to at least one item of blending information by using a blending device, thereby generating at least one blend, wherein the blending device comprises at least two reservoirs for each of the at least two materials, and wherein the at least two materials comprise a powder;
   ii. detecting at least one material property of the blend by using at least one detector; and
   iii. transforming the material property into the encryption key by using at least one data processing device configured for applying at least one transformation algorithm to the material property.

2. The method according to claim 1, wherein step iii. is fully or partially performed in a computer-implemented fashion.

3. The method according to claim 1, wherein the data comprises one or more of digital data, binary data, error correction data, payload data and; control data.

4. The method according to claim 1, wherein the data is subdivided into data packages.

5. The method according to claim 1, wherein the at least one item of blending information comprises n blending variables, with n being a positive integer, wherein, in step ii., m material properties of the blend are detected, with m being a positive integer.

6. The method according to claim 1, wherein the at least two materials comprise at least two materials selected from the group consisting of:
   an inorganic powder, specifically an inorganic powder made of a mineral;
   an organic powder, specifically an organic powder made of a polymer; and
   a pigment.

7. The method according to claim 1, wherein the at least one item of blending information comprises at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended.

8. The method according to claim 7, wherein the blending device is a printer configured for blending the at least two materials according to the at least one item of blending information onto at least one substrate, wherein the substrate comprises a drum having a receiving surface for receiving the blend.

9. The method according to claim 8, wherein the drum is a rotating drum, wherein the method further comprises at least one cleaning step in which, after detecting the at least one material property, the blend is removed from the receiving surface of the drum.

10. The method according to claim 1, wherein the at least one material property comprises at least one of a physical property of the blend and a chemical property of the blend.

11. The method according to claim 1, wherein the transforming of the material property into the encryption key comprises subjecting the at least one material property to at least one test, wherein the encryption key is generated in accordance with the result of the test.

12. A method of data transmission between at least two communication systems, specifically for data transmission over an insecure channel, the method comprising:
   I. assigning the role of a transmitting system to at least one of the communication systems;
   II. assigning the role of a receiving system to at least another one of the communication systems;
   III. providing at least one item of blending information both to the transmitting system and to the receiving system;
   IV. generating, by the transmitting system, at least one encryption key by
      a. blending at least two materials according to at least one item of blending information by using a blending device, thereby generating at least one blend, wherein the blending device comprises at least two reservoirs for each of the at least two materials, and wherein the at least two materials comprise a powder;
      b. detecting at least one material property of the blend by using at least one detector; and
      c. transforming the material property into the encryption key by using at least one data processing device configured for applying at least one transformation algorithm to the material property;
   V. encrypting, by the transmitting system, the data to be transmitted by using the encryption key, thereby generating encrypted data;
   VI. transmitting, by the transmitting system, the encrypted data to the receiving system;

VII. receiving, by the receiving system, the encrypted data;
VIII. generating, by the receiving system, the at least one encryption key by
  d. blending at least two materials according to at least one item of blending information by using a blending device, thereby generating at least one blend, wherein the blending device comprises at least two reservoirs for each of the at least two materials, and wherein the at least two materials comprise a powder;
  e. detecting at least one material property of the blend by using at least one detector; and
  f. transforming the material property into the encryption key by using at least one data processing device configured for applying at least one transformation algorithm to the material property; and
IX. decrypting, by the receiving system, the encrypted data by using the encryption key.

13. The method according to claim 12, wherein the method is performed iteratively wherein, in the iterations, the roles of the transmitting system and of the receiving system are reassigned.

14. The method according to claim 13, wherein, in at least one of the iterations, in step III., at least one item of blending information is provided for at least one subsequent iteration.

15. A method of encrypting data, the method comprising:
  a. generating at least one encryption key by
    i. blending at least two materials according to at least one item of blending information by using a blending device, thereby generating at least one blend, wherein the blending device comprises at least two reservoirs for each of the at least two materials, and wherein the at least two materials comprise a powder;
    ii. detecting at least one material property of the blend by using at least one detector; and
    iii. transforming the material property into the encryption key by using at least one data processing device configured for applying at least one transformation algorithm to the material property; and
  b. encrypting the data by using the encryption key, thereby generating encrypted data.

16. A method of decrypting encrypted data, the method comprising:
  A. generating at least one key by
    i. blending at least two materials according to at least one item of blending information by using a blending device, thereby generating at least one blend, wherein the blending device comprises at least two reservoirs for each of the at least two materials, and wherein the at least two materials comprise a powder;
    ii. detecting at least one material property of the blend by using at least one detector; and
    iii. transforming the material property into the encryption key by using at least one data processing device configured for applying at least one transformation algorithm to the material property; and
  B. decrypting the encrypted data by using the encryption key, thereby generating decrypted data.

17. An encryption key generating device for generating at least one encryption key for encrypting data, comprising:
  at least one blending device for blending at least two materials according to at least one item of blending information, thereby generating at least one blend, wherein the blending device comprises at least two reservoirs for each of the at least two materials, and wherein the at least two materials comprise a powder;
  at least one detecting device configured for detecting at least one material property of the blend, the detecting device having at least one detector; and
  at least one transforming device configured for transforming the material property into the encryption key, the transforming device having at least one data processing device configured for applying at least one transformation algorithm to the material property.

18. The encryption key generating device according to claim 17, wherein the encryption key generating device is configured for performing a method of generating at least one encryption key for encrypting data, specifically for data transmission over an insecure channel, the method comprising:
  i. blending at least two materials according to at least one item of blending information by using a blending device, thereby generating at least one blend, wherein the blending device comprises at least two reservoirs for each of the at least two materials, and wherein the at least two materials comprise a powder;
  ii. detecting at least one material property of the blend by using at least one detector; and
  iii. transforming the material property into the encryption key by using at least one data processing device configured for applying at least one transformation algorithm to the material property.

19. A printer configured for use as a blending device in the encryption key generating device, wherein the encryption key for encrypting data is generated by
  i. blending at least two materials according to at least one item of blending information by using a blending device, thereby generating at least one blend, wherein the blending device comprises at least two reservoirs for each of the at least two materials, and wherein the at least two materials comprise a powder;
  ii. detecting at least one material property of the blend by using at least one detector; and
  iii. transforming the material property into the encryption key by using at least one data processing device configured for applying at least one transformation algorithm to the material property,
  wherein the printer is configured for receiving the at least one item of blending information and for performing at least step i. of the method of generating at least one encryption key.

20. The printer according to claim 19, wherein the printer comprises one or more of a drum; a laser, a lens system; a cleaning element; a cassette; at least one transporting element; and a printer control unit configured for controlling the printer.

* * * * *